United States Patent [19]

Henderson et al.

[11] Patent Number: 5,752,489
[45] Date of Patent: May 19, 1998

[54] INTEGRATED FUEL MEASUREMENT AND CONTROL SYSTEM FOR GASEOUS FUELS

[75] Inventors: Gregory H. Henderson; Thomas L. Bailey; Edward Benjamin Manring, all of Columbus, Ind.

[73] Assignee: Cummins Engine Company, Inc., Columbus, Ind.

[21] Appl. No.: 798,334

[22] Filed: Feb. 10, 1997

[51] Int. Cl.⁶ .................... F02M 51/00; F02M 21/04
[52] U.S. Cl. .................. 123/494; 123/527; 251/30.02; 251/129.07; 251/282
[58] Field of Search .............. 123/27 GE, 525–529, 123/494; 251/129.07, 129.15, 129.17, 30.02, 282

[56] References Cited

U.S. PATENT DOCUMENTS

| | | |
|---|---|---|
| 3,800,832 | 4/1974 | Umphenour et al. . |
| 4,430,978 | 2/1984 | Lewis et al. . |
| 4,546,739 | 10/1985 | Nakajima et al. . |
| 4,718,386 | 1/1988 | Gieles . |
| 5,011,113 | 4/1991 | Stobbs et al. . |
| 5,105,790 | 4/1992 | Nye, Jr. ............................ 123/527 |
| 5,237,981 | 8/1993 | Polletta et al. . |
| 5,285,756 | 2/1994 | Squires . |
| 5,367,999 | 11/1994 | King et al. ........................ 123/527 |
| 5,383,647 | 1/1995 | Jorach et al. . |
| 5,394,852 | 3/1995 | McAlister . |
| 5,396,926 | 3/1995 | Pataki et al. . |
| 5,419,492 | 5/1995 | Gant et al. . |
| 5,445,134 | 8/1995 | Barbanti ........................... 123/527 |
| 5,479,902 | 1/1996 | Wirbeleit et al. . |
| 5,584,467 | 12/1996 | Harnett et al. .................... 123/527 |
| 5,595,163 | 1/1997 | Nogi et al. ........................ 123/527 |
| 5,615,655 | 4/1997 | Shimizu et al. ................... 123/527 |

*Primary Examiner*—Erick R. Solis
*Attorney, Agent, or Firm*—Sixbey, Friedman, Leedom & Ferguson; Charles M. Leedom, Jr.

[57] ABSTRACT

A fuel measurement and control system for a gaseous fuel engine having a solenoid actuated fuel flow control valve which is electronically actuated to control a desired metering duration when the control system is operating in a fuel flow control mode. The fuel measurement and control system further includes mode control valve for switching the control system between a fuel flow control mode and a positive fuel shutoff mode, wherein the fuel flow control valve is prevented from opening when the control system is operating in a positive fuel shutoff mode. The fuel flow control valve includes a pressure balance chamber to balance the biasing forces acting on the valve from the gaseous fuel, wherein gaseous fuel is introduced into the pressure balancing chamber to provide the balancing forces. The mode control valve connects the pressure balance chamber to either the fuel supply or the air stream mixer inlet to provide the desired pressure in the pressure balance chamber, wherein the fuel flow control valve is biased to a closed position and prevented from opening when the pressure balance chamber is connected to the air stream mixer inlet and the fuel flow control valve is pressure balanced and may be actuated to control fuel flow when the pressure balance chamber is connected to the gaseous fuel supply. A damping chamber is connected to the pressure balance chamber for damping the oscillations of the solenoid actuator and further reducing the effects of engine vibrations on the solenoid actuator.

32 Claims, 13 Drawing Sheets

INTEGRATED FUEL MEASUREMENT AND CONTROL SYSTEM FOR GASEOUS FUELS

BACKGROUND OF THE INVENTION

1. Technical Field

The present invention relates to a fuel measurement and control system for the introduction of fuel in gaseous fuel engines. More particularly, the present invention relates to an integrated fuel measurement and control system for gaseous fuels which controls fuel flow, measures fuel mass flow, provides positive fuel shutoff, and provides fuel/air mixing.

2. Background Art

Currently, there is a new interest in using alternative fuels in the automotive industry to meet governmental emission requirements and fuel economy standards and to reduce dependence on foreign oil. Alternative fuels being investigated for potential use in automotive vehicles are natural gas, propane, and other gaseous fuels, which are particularly attractive due to the significantly reduced emissions that gaseous fuel engines produce as compared to those of liquid fuel engines. If appropriate technology existed to effectively and efficiently use gaseous fuels, then a much wider variety of fuel options could be available to power automotive engines.

Heretofore, such gaseous powered vehicles have used either a gas supply ring to supply gas at a location just above a disabled conventional gasoline carburetor, or employ a special gaseous fuel carburetor. Port injection of gaseous fuels into vehicle engine ports through a fuel injector has also been proposed. However, port injection of gaseous fuels is sensitive to variations in manifold pressure, gas temperature, and gas pressure caused by engine operating conditions. As a result, extensive control techniques are required in order to maintain the desired quantity of injected fuel over a wide range of engine operating conditions.

One such control technique for injecting gaseous fuels into the combustion chamber of an internal combustion engine is disclosed in U.S. Pat. No. 5,383,647 issued to Jorach et al. The disclosed gas-injection valve includes a longitudinally displaceable piston having connected thereto a poppet valve for controlling an injection port, wherein the piston separates a gaseous fuel space from a hydraulic control space capable of being pressurized by having hydraulic control fluid fed thereto by a pressure pump. The gas-injection valve is arranged such that the gas pressure within the gaseous fuel space alone is sufficient to hold the poppet valve in its closed position when the hydraulic space is depressurized. The hydraulic control fluid is then used to open the poppet valve by feeding hydraulic control fluid into the hydraulic control space until the pressure builds up and overcomes the gas pressure within the gas space to displace the piston and, in turn, the poppet valve. By requiring use of a hydraulic control fluid in the hydraulic control space, it is necessary to pump two fluids, the hydraulic control fluid and the injected gas, into the gas-injection valve, and further necessary to control the pressure of both fluids, resulting in an unnecessarily complex system. Furthermore, utilizing a pressure pump to pressurize the hydraulic control space in order to control the opening of the valve does not provide the precision required when using gaseous fuels which are sensitive to engine operating conditions.

Other fuel systems have been designed to account for the sensitive variations in gaseous fuels due to changes in manifold pressure, gas temperature, and gas pressure caused by engine operating conditions. U.S. Pat. No. 5,367,999 issued to King et al. discloses a gaseous fuel delivery system which monitors the fuel pressure, intake manifold pressure, and fuel temperature to provide a desired controlled supply pressure for the fuel being delivered to the fuel injector. However, the fuel delivery system of King et al. merely delivers the gaseous fuel to a fuel injector and does not provide for fuel metering duration control of the fuel injector or fuel metering measurements, which are critical when port injecting gaseous fuels.

It is necessary for gaseous fuel injecting systems to perform the following functions: 1) regulate the fueling rate into the air stream; 2) provide a measurement of the fuel flow rate for Electronic Control Unit (ECU) closed-loop control; 3) provide for positive fuel shutoff; and 4) adequately mix the fuel with the air stream. In a conventional system, these functions are performed by individual components as illustrated in FIG. 1. The gaseous fuel is typically introduced into the air stream after passing through the following components, respectively, a fuel filter 2, a pressure regulator 3, a shutoff valve 4, a flow straighter 5, a gas mass sensor 6, a flow control valve 7, and a mixer sleeve 8, and then introduced into the air stream. All of the separate individual components performing these functions add to the costs and complexity of manufacturing the engine, as well as requiring a large amount of space within the engine for positioning the components. Further, the entire engine fuel flow must pass through a separate shutoff valve, so a large and expensive valve must be used to achieve positive fuel shut off. There is also typically a fuel pressure loss across the separate shutoff valve as the fuel passes through it, which can detrimentally affect the fuel delivery to the engine. Therefore, there is clearly a need for a fuel control system for gaseous fuel systems which does not require the entire gaseous fuel flow to pass through a separate shutoff valve before being delivered to a flow control valve.

In order to provide a control valve having a quick response and accurate control, it is known to utilize solenoid actuated valves designed to balance the fluid induced forces acting on the movable valve elements. Without the use of such force balancing, it would be necessary for the solenoid to overcome the forces exerted by the pressure of the fluid contained within the control valve in order to actuate the valve in an open position, thereby possibly requiring the need for rather large solenoids and increased levels of actuation current. Balancing the fluid pressure forces acting on the valve allows the valve to be easily and quickly controlled and permits rapid valve response, since the solenoid valve is capable of shifting quickly between open and closed positions. The balancing of fluid forces acting on the valve also permits the input current to the solenoid actuator to be substantially reduced, which allows smaller, fast-acting control valves to be used with a large range of flow rates.

Currently existing force balanced control valves used in electronically controlled fuel injectors utilize return springs or a separate hydraulic fluid to balance the forces exerted by the injected fuel on the control valve. However, it is difficult to accurately and precisely balance the fuel induced pressure forces using a return spring or separate hydraulic fluid, as the balancing forces are not always precisely matched. As a result, the imperfectly balanced forces tend to bias the electronically controlled valve in one direction. The electrical actuator for the fuel injector valve must then overcome this biasing force during actuation, which results in a slower response time for actuation and imprecise metering duration. It is therefore desirable to obtain an electronically actuated valve which is not subjected to such biasing forces in order to provide a fast-acting and accurate control valve. Furthermore, when utilizing a separate hydraulic fluid to counteract the fuel flow forces, it is necessary to regulate both the injected fuel and a separate hydraulic fluid, which complicates the fuel control system by requiring additional pressure regulators and pressure sensors.

Accordingly, there is clearly a need for a electronically actuated control valve which is not subjected to fuel biasing forces for injecting gaseous fuels in an engine to provide a fast-acting and accurate control valve. Further, there is a need for a electronically actuated valve for a gaseous fuel injector which more accurately balances the fuel flow forces acting on the valve without the need for separate hydraulic fluids or balancing springs.

SUMMARY OF THE INVENTION

It is an object of the present invention to overcome the aforementioned shortcomings associated with the prior art.

It is yet a further object of the present invention is to provide an integrated fuel measurement and control system for gaseous fuels having a reduced size, a reduced cost to manufacture, an improved response time, and lower system fuel pressure losses.

Another object of the present invention is to provide an integrated fuel measurement and control system for gaseous fuels having a substantially frictionless electronically actuated control valve for providing a quick valve response and accurate fuel flow control.

Yet another object of the present invention is to provide an integrated fuel measurement and control system for gaseous fuels having an electronically actuated control valve which is precisely force balanced to permit quick valve response using minimal actuation current.

It is yet a further object of the present invention is to provide an integrated fuel measurement and control system for gaseous fuels in which the electronically actuated control valve position is precisely regulated by the amount of current supplied to the electronically actuated control valve.

Another object of the present invention is to provide an integrated fuel measurement and control system for gaseous fuels having an electronically actuated control valve which is precisely force balanced to minimize the size of the solenoid assembly to create a compact, inexpensive valve assembly.

It is another object of the present invention to force balance the electronically actuated control valve using the gaseous fuel introduced into the engine to provide the balancing forces for the control valve.

It is a further object of the present invention to provide an integrated fuel measurement and control system wherein gaseous fuel is continuously supplied to the electronically actuated control valve at all times to maintain a quick response time by the control valve when actuated.

Yet another object of the present invention is to provide an integrated fuel measurement and control system for gaseous fuels having a mode selection valve which prevents the electronically actuated control valve from opening when the mode selection valve is in a fuel shutoff mode.

It is a another object of the present invention to provide an integrated fuel measurement and control system which provides a redundant fuel shutoff capability for closing the control valve without the use of the control valve actuator.

Yet a further object of the present invention is to provide an integrated fuel measurement and control system for gaseous fuels which dampens the oscillations of the electronically actuated control valve and reduces the effect of engine vibrations on the position of the control valve.

Another object of the present invention is to provide an integrated fuel measurement and control system for gaseous fuels which accurately measures the amount of fuel mass flow during actuation of the control valve.

These as well as additional objects and advantages of the present invention are achieved by providing a fuel measurement and control system for a gaseous fuel engine having a fuel flow control valve for controlling the flow of gaseous fuel into the engine. The fuel flow control valve includes a solenoid actuated poppet valve subject to biasing forces produced by the gaseous fuel flowing through the fuel flow control valve, wherein the solenoid actuated poppet valve is electronically actuated to allow fuel flow for a desired metering amount when the control system is operating in a fuel flow control mode. A supply passage is connected to a valve supply chamber within the fuel flow control valve for supplying gaseous fuel to the fuel flow control valve. The fuel measurement and control system further includes mode control valve for switching the control system between a fuel flow control mode and a positive fuel shutoff mode. The fuel flow control device is prevented from actuating the solenoid actuating poppet valve when the control system is operating in a positive fuel shutoff mode.

A pressure balance chamber is positioned on an opposite side of the solenoid actuator from the valve supply chamber to balance the biasing forces acting on the poppet valve from the gaseous fuel in the valve supply chamber, wherein the fuel measurement and control system introduces gaseous fuel into the pressure balancing chamber to create a pressure in the pressure balance chamber equal to the pressure in the valve supply chamber to provide the balancing forces. The mode control valve connects the pressure balance chamber to either the fuel supply or a low pressure source, such as the air stream mixer inlet pressure, to provide a desired pressure in the pressure balance chamber, depending upon the operating mode of the fuel measurement and control system. When the pressure balance chamber is connected to the low pressure source, the solenoid actuated poppet valve is biased to a closed position by the pressure of the gaseous fuel in the valve supply chamber and prevented from opening. When the pressure balance chamber is connected to the fuel supply, the solenoid actuated poppet valve is pressure balanced and may be actuated to control fuel flow.

The fuel measurement and control system also includes a damping chamber connected to the pressure balance chamber for damping the oscillations of the flow control valve and further reducing the effects of engine vibrations on the flow control valve. The fuel measurement and control system also allows the amount of fuel mass flow during the actuation of the poppet valve to be measured, wherein fuel flow measurement is performed through the use of a supply pressure sensor for measuring the fuel supply pressure, an air stream mixer inlet pressure sensor for measuring an air stream mixer inlet pressure, a temperature sensor for measuring the fuel supply temperature, and a displacement sensor for measuring the amount of movement of the poppet valve.

DETAILED DESCRIPTION OF THE PREFERRED EMBODIMENT

Figure 2:
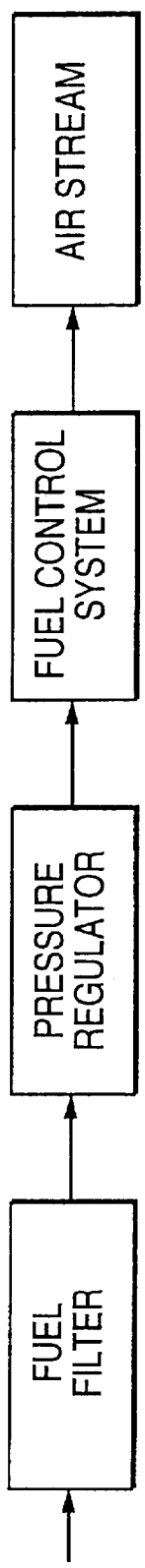
FIG. 2 a schematic block diagram of the fuel measurement and control system of the present invention.

The present invention is directed to an integrated gaseous fuel measurement and control system 10 which utilizes less individual components than conventional gaseous fuel systems by integrating the functions necessary for operating a gaseous fuel system into a unitary integrated gaseous fuel measurement and control system 10. As can be seen from FIG. 2, the integrated gaseous fuel measurement and control system 10 of the present invention integrates the functions performed conventionally by a plurality of separate components, such as shutoff valves, flow straighteners, gas mass sensors, flow control valves, and mixer sleeves, into a unitary structure. By using integrated components, the integrated gaseous fuel measurement and control system 10 of the present invention realizes the following advantages: 1) reduced costs by eliminating multiple components, 2) reduced packaging size, 3) improve response time, and 4) lower system fuel pressure losses. These advantages will be set forth in hereinbelow as the preferred embodiment of the integrated gaseous fuel measurement and control system 10 is described in greater detail.

Figure 3:
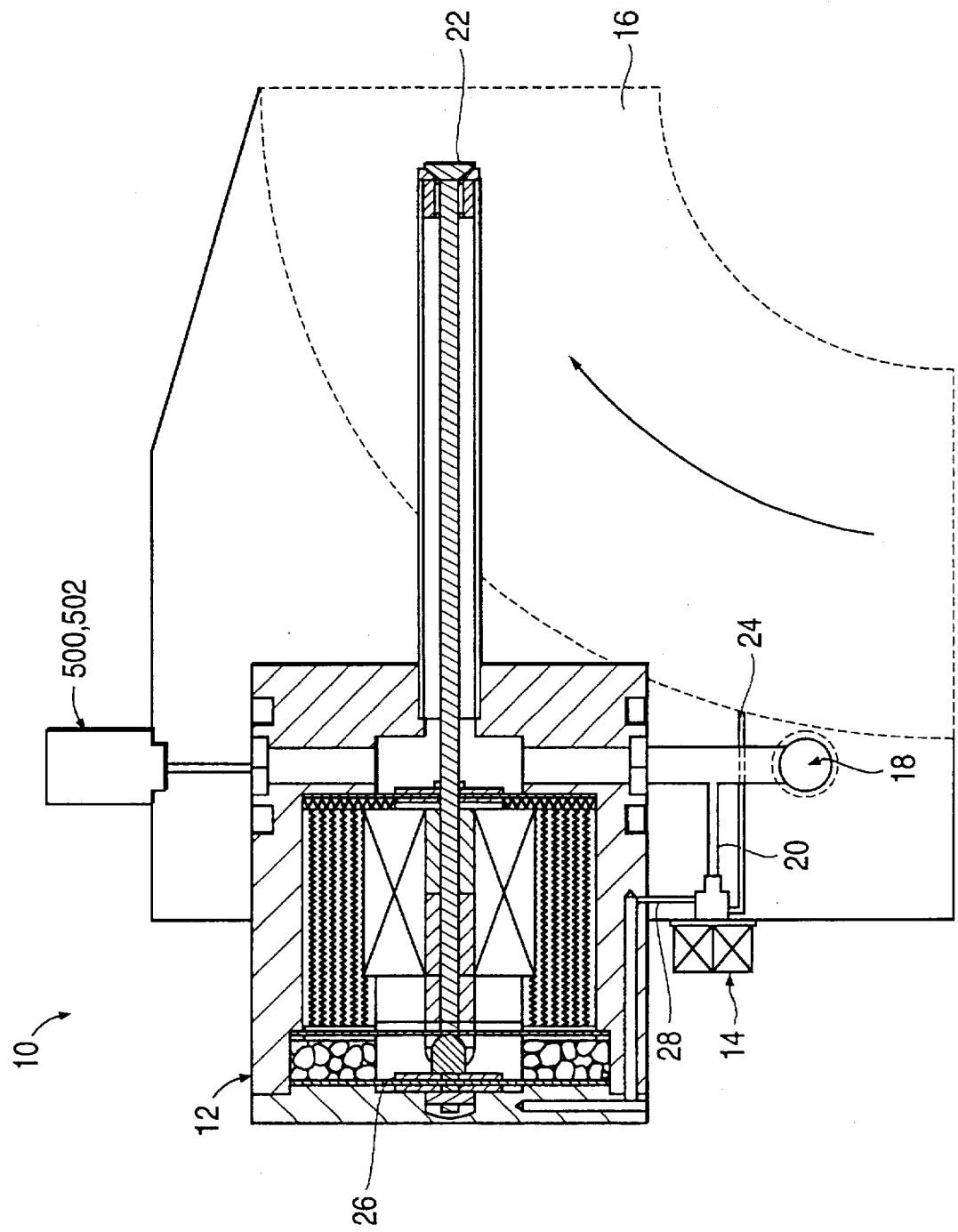
FIG. 3 is a cross-sectional view of the fuel measurement and control system designed in accordance with a preferred embodiment of the invention wherein an injector valve extends into an air stream mixer inlet.

Referring now to FIG. 3, a gaseous fuel measurement and control system 10 designed in accordance with a preferred embodiment of the present invention is illustrated. The gaseous fuel measurement and control system 10 includes a flow control valve 12 for controlling the injection of gaseous fuel into an engine and a mode selection valve 14 attached to the flow control valve 12 for determining the operating mode of the gaseous fuel measurement and control system 10, where the mode selection valve 14 may provide a positive fuel shutoff for the gaseous fuel measurement and control system 10 to prevent the flow control valve 12 from opening and introducing gaseous fuel into the engine, as described in greater detail hereinbelow.

The gaseous fuel measurement and control system 10 is shown and will be described in one of its possible embodiments with the flow control valve 12 extending into an air stream mixer inlet 16; however, it is understood that the gaseous fuel measurement and control system 10 may be positioned in various locations where fuel is introduced either upstream or downstream of a gaseous fuel compressor (not shown) or may be used for port injection of gaseous fuel. Gaseous fuel is supplied to the flow control valve 12 through a fuel inlet 18 which is connected downstream of a fuel supply. A portion of the gaseous fuel supplied to fuel inlet 18 is directed to the mode selection valve 14 through a fuel supply passage 20 which branches off from the fuel inlet 18. In this arrangement, the pressure of the gaseous fuel supplied to mode selection valve 14 is the same as the pressure of the gaseous fuel supplied to flow control valve 12, since the gaseous fuel is being supplied to both valves 12 and 14 from the fuel inlet 18.

The flow control valve 12 includes a moveable valve element, such as a poppet valve 22, extending into the air stream mixer inlet 16 for dispersing and mixing the gaseous fuel with the air in the air stream mixer inlet 16. The poppet valve 22 includes a poppet stem 36 having an outwardly flared end 38 extending into the air stream mixer inlet 16. The mode selection valve 14 is also connected to the air stream mixer inlet 16 via an air supply passage 24 which extends between the mode selection valve 14 and the air stream mixer inlet 16. While the preferred embodiment of the present invention is described as having the mode selection valve 14 connected to the air stream mixer inlet 16, it is understood that the mode selection valve 14 may alternatively be connected to any available low pressure source having a pressure lower than that of the gaseous fuel supplied to the flow control valve 12. The mode selection valve 14 is further connected to a pressure balance chamber 26 in the flow control valve 12 through a passage 28, wherein the mode selection valve introduces either the gaseous fuel flowing in fuel supply passage 20 or the air flowing in air supply passage 24 into pressure balance chamber 26 through passage 28, depending upon the operating mode of the gaseous fuel measurement and control system 10.

Figure 1:
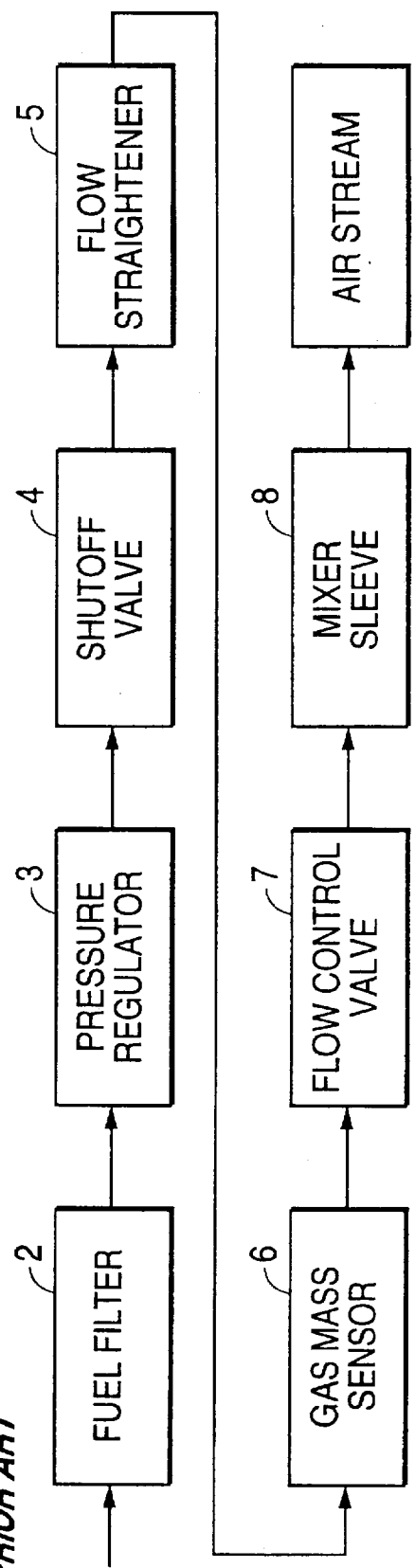
FIG. 1 a schematic block diagram of a conventional gaseous fuel system.
Figure 4A:
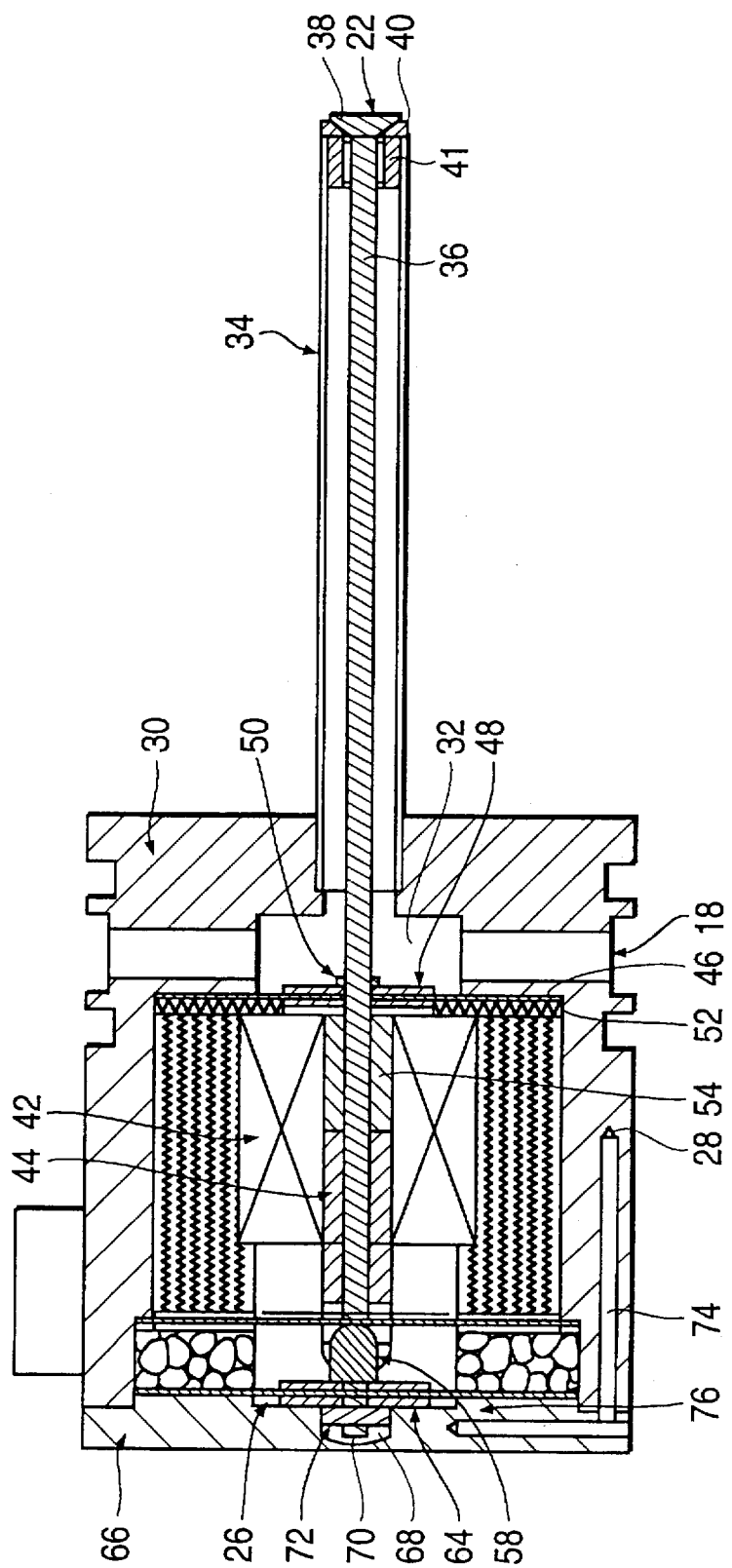
FIG. 4(A) is a cross-sectional view of the fuel flow control valve designed in accordance with a preferred embodiment of the invention wherein the control valve is shown in its closed position.
Figure 4B:
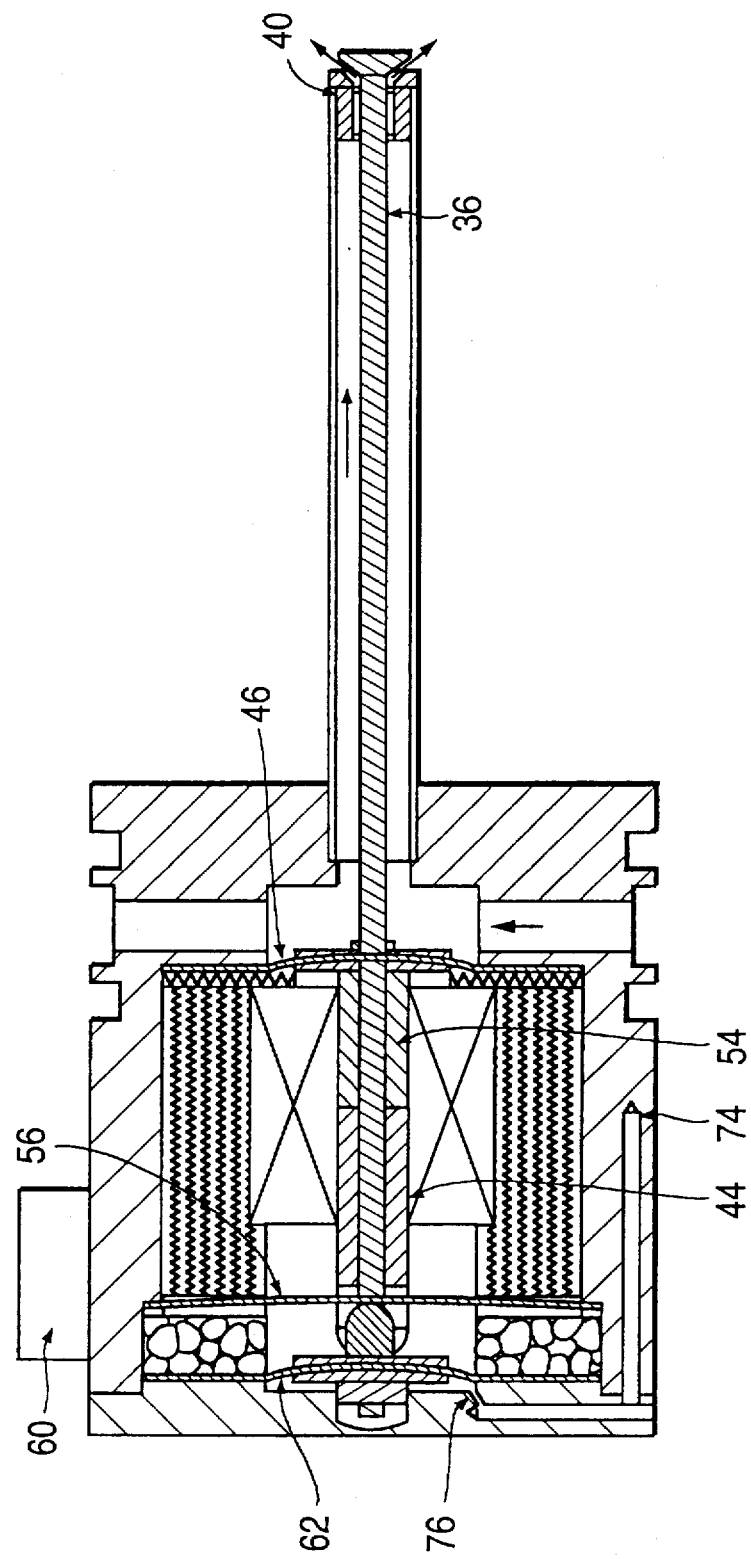
FIG. 4(B) is a cross-sectional view of the fuel flow control valve of FIG. 4(A) in its open position.

Referring now to FIGS. 4(A) and 4(B), the flow control valve 12 of FIG. 1 will be described in greater detail in its closed and open positions, respectively. The gaseous fuel flowing from fuel inlet 18 enters through a housing 30 for the flow control valve 12 and into a valve supply chamber 32. The valve supply chamber 32 extends through a tube 34 which extends into air stream mixer inlet 16, wherein tube 34 surrounds the poppet stem 36. When poppet valve 22 is in its closed position, shown in FIG. 4(A), flared end 38 abuts a seat 40 in the end of tube 34 to provide a leak-tight seal, thus preventing gaseous fuel from flowing through poppet valve 22. The fuel flow rate for the gaseous fuel measurement and control system 10 is controlled by regulating the poppet valve 22 open area by the modulating poppet stem 36 position, wherein poppet stem 36 open area is the distance from which the flared end 38 moves away from seat 40. A guide element 41 is positioned within the tube 34 adjacent seat 40 for guiding the movement of poppet stem 36 along the longitudinal direction of the tube 34.

The poppet stem 36 is electro-magnetically actuated using a solenoid coil 42 and armature 44, wherein the armature 44 is connected to poppet stem 36. A current applied to solenoid coil 42 causes armature 44 to move in the direction of poppet valve 22 which, in turn, causes poppet stem 36 to move in the same direction. The valve supply chamber 32 is enclosed by the flow control valve housing 30, poppet valve 22, and a flexible diaphragm 46 which separates the valve supply chamber 32 from the solenoid 42 actuated components. The diaphragm 46 extends around poppet stem 36 and through a washer 48 surrounding poppet stem 36 which, along with snap ring 50, prevents the flow of gaseous fuel between the poppet stem 36 and diaphragm 46. An outer annular portion of diaphragm 46 is sealingly connected to valve housing 30 by a guide 52. The diaphragm 46 is formed of a flexible elastomer to allow movement of the poppet stem 36. The washer 48 is positioned within guide 52 in the housing 30 to assist in the movement of poppet stem 36 in the longitudinal direction of tube 34, where the washer 48 reciprocates within a center portion of guide 52. A nonmagnetic spacer 54 is positioned within solenoid coil 42 adjacent to and abutting armature 44 and washer 48. Therefore, as the current applied to solenoid coil 42 causes armature 44 to move to the right in FIG. 4(A), the abutting nonmagnetic spacer 54 will also move in that direction and, in turn, similarly cause washer 48 to move in that direction. The diaphragm 46 will, in turn, flex causing the poppet stem 36 to move into an open position as shown in FIG. 4(B).

After the poppet valve 22 has been actuated to its open position by solenoid coil 42 and once current is no longer being applied to the solenoid coil 42, the poppet valve 22 is returned to its closed position by the biasing force exerted on the poppet stem 36 by a return spring 56, which may include a flat leaf spring or flexure (as illustrated) or a conventional coil spring. The flexure spring 56 is attached to the poppet stem 36 by a flexure yoke 58 on the opposite side of the flexure spring 56 from solenoid coil 42. As poppet stem 36 is actuated to its open position, flexure yoke 58 is forced against spring 56 so as to overcome the bias force of spring 56 causing flexure spring 56 to bend in the direction of valve supply chamber 32. Upon removal of the current applied to solenoid coil 42, flexure spring 56 will return poppet stem 36 to its closed position. The displacement of the poppet stem 36 can be measured by measuring the strain on the flexure spring 56 using strain gage sensors 60 attached to flexure spring 56, wherein the flexure spring 56 strain is proportional to the poppet stem 36 displacement. It is understood that poppet stem 36 displacement can also be measured using other displacement measuring devices to sense poppet stem 36 movement, such as Hall Effect sensors, magnetic encoders, LVDTs, and fiber optic displacement sensors.

The flexure spring 56 should be manufactured from a very high fatigue limit material, such as Inconel®, which allows a design with the correct spring rate that can be positioned within the integrated gaseous fuel measurement and control system 10 housing bore. The flexure spring is also preferably nonmagnetic so that it does not interfere with the coil magnetic flux path.

The poppet valve 22 is opened by electronic solenoid coil 42 and closed by flat-plate flexure spring 56. The opening force is a function of the electrical current flowing through the solenoid coil 42 and is created by the magnetic field which moves the armature 44 toward valve supply chamber 32. The amount of current supplied to solenoid coil 42 is varied to control the desired fuel metering, where the poppet valve 22 open area is determined by the amount of current supplied to solenoid coil 42. The poppet valve 22 can be situated at any position by regulating the current to the coil. The flexure spring 56 not only provides the return force for the poppet valve 22 after the current is removed, but also frictionlessly locates the upper position of the poppet stem 36. The flexure spring 56 prevents the armature 44 from rubbing the solenoid coil 42 inner wall by resisting any asymmetric radial forces from the solenoid coil 42.

Figure 5:
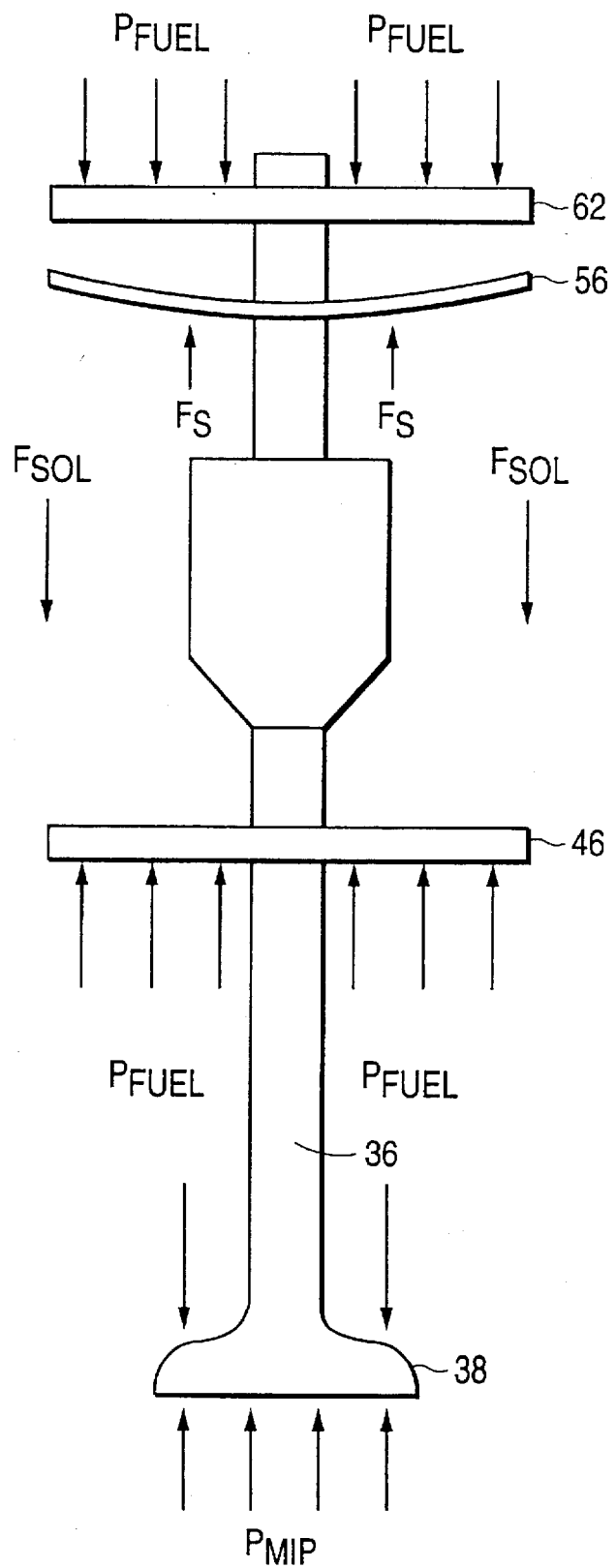
FIG. 5 is a fragmentary side view showing the forces acting on the fuel flow control valve of the present invention in the fuel flow control mode.

When no current is supplied to solenoid coil 42, the forces acting on poppet valve 22 will tend to bias the poppet valve in the closed position. In order to avoid the necessity of using a substantially large solenoid or a large amount of current applied to solenoid coil 42 to overcome this biasing force, the forces from the gaseous fuel pressure acting on poppet valve 22 are pressure balanced so that the gaseous fuel pressure does not bias the poppet valve 22 in any direction. The balancing of the gaseous fuel forces is achieved by introducing gaseous fuel into the pressure balance chamber 26, where the gaseous fuel exerts a force on flexible diaphragm 62 to assist in counterbalancing the forces exerted in the opposite direction by the gaseous fuel acting on flexible diaphragm 46. In the fuel flow control mode, there are numerous opening and closing forces acting on the poppet valve 22 as illustrated in FIG. 5. The opening forces include: (1) the solenoid actuator force; (2) the fuel pressure in the pressure balance chamber 26 acting on the upper diaphragm 62; and (3) the fuel pressure acting on the flared end 38 of poppet stem 36. The closing forces include: (1) the flexure spring 56 force, (2) the fuel pressure acting on the flexible diaphragm 46 in fuel supply chamber 32, and (3) the mixer inlet pressure acting on the flared end 38 of poppet stem 36. The mathematical poppet valve 22 force equation is defined by, $$F_{sol} + P_{fuel}A_{upper} + P_{fuel}A_{poppet} = F_{spg} + P_{fuel}A_{lower} + P_{MIP}A_{poppet},$$
(opening force) (closing force)

where $F_{sol}$—Solenoid Coil 42 Force, $F_{spg}$—Flexure Spring 56 Force, $P_{fuel}$—Gaseous Fuel Pressure, $P_{MIP}$—Mixer Inlet Pressure of air stream, $A_{upper}$—Equivalent piston area of upper diaphragm 62 seal in pressure balance chamber, $A_{poppet}$—Area defined by poppet stem 36 and flared end 38, $A_{lower}$—Equivalent piston area of lower diaphragm 46 seal in fuel supply chamber 32.

The mixer inlet pressure force will tend to close poppet valve 22 since the air pressure upstream of the throttle should never drop below atmospheric pressure. To greatly reduce the solenoid 42 force requirements and to eliminate fuel pressure effects on the actuation characteristics, the integrated gaseous fuel measurement and control system 10 is pressure balanced with respect to the fuel supply pressure. This pressure balancing is accomplished by selecting the diaphragm seal equivalent piston areas such that the net force due to the fuel supply pressure is zero, shown by the following equation:

$$P_{fuel}A_{upper} + P_{fuel}A_{poppet} - P_{fuel}A_{lower} = 0$$

Thus, in order to pressure balance the integrated gaseous fuel measurement and control system 10, the equivalent piston area of the upper diaphragm seal 62, $A_{upper}$, must be less than the area of the lower diaphragm seal 46, $A_{lower}$ by the area of the flared end 38 of poppet stem 36, $A_{poppet}$ so that:

$$A_{upper} = A_{lower} - A_{poppet}$$

When the integrated gaseous fuel measurement and control system 10 is pressure balanced, the force applied by the solenoid coil 42 must only overcome only the flexure spring 62 force, $F_S$, and the force due to the mixer inlet pressure, $F_{mip}$, as shown by the following equation:

$$\underset{\text{(opening force)}}{F_{sol}} = \underset{\text{(closing force)}}{F_{spg} + P_{MIP}A_{poppet}}$$

Figure 6:
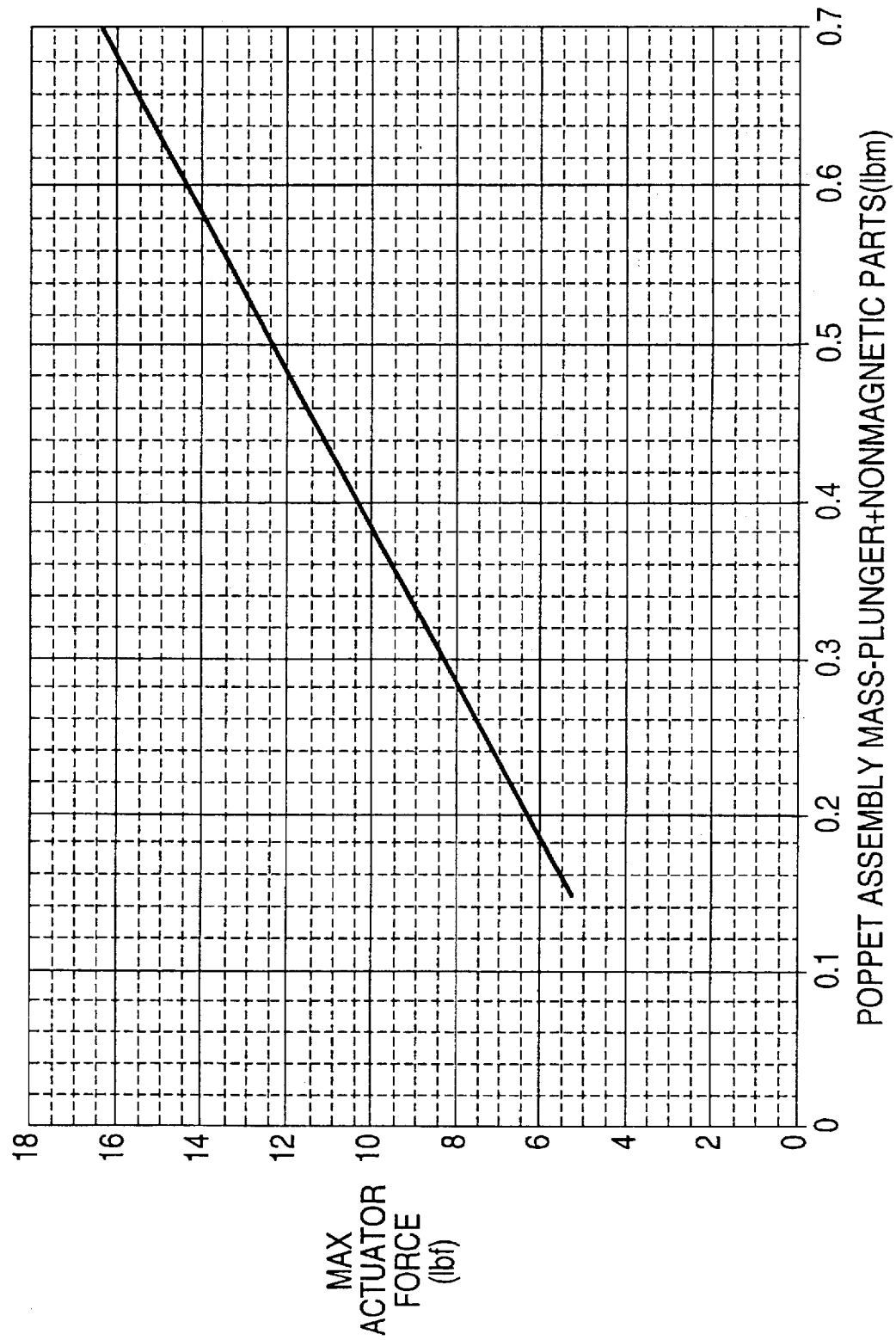
FIG. 6 is a graphical illustration of the solenoid force required to actuate the flow control valve with a 50 Hz natural frequency as a function of the mass of the moveable components of the flow control valve of the present invention.

Thus, the solenoid coil 42 must overcome the sum of the maximum spring force, $F_{spg}$, and the maximum force exerted by the mixer inlet pressure, $P_{MIP}$, to actuate poppet valve 22. FIG. 6 illustrates the maximum force required by the solenoid coil 42 as a function of the poppet valve 22 assembly mass to obtain a poppet valve 22 natural frequency of 50 Hz. The curve presented in FIG. 6 was generated by calculating the maximum spring force, $F_{spg}$, based on the natural frequency target and maximum travel assumption and adding in the maximum force expected to be generated by the mixer inlet pressure, $P_{MIP}$, plus a 10% margin.

In the pressure balance chamber 26, a washer 64, similar to washer 48 is positioned around poppet stem 36 and attached to diaphragm 62 to prevent the flow of gaseous fluid from pressure balance chamber 26 between the poppet stem 36 and diaphragm 62. The pressure balance chamber 26 is enclosed by diaphragm 62 and an end cap 66 attached to the flow control valve housing 30. End cap 66 includes a cavity 68 for accommodating end 70 of poppet stem 36, wherein the end 70 of poppet valve 36 is threaded to allow a nut 72 to be fastened to poppet stem 36. Nut 72 is secured on poppet stem 36 to abut washer 64, so that washer 64 and diaphragm 62 will move in conjunction with the movement of poppet stem 36.

In order to provide a fluid path between passage 28 extending from mode selection valve 14 and the pressure balance chamber 26, a pressure balance chamber passage 74 is provided within housing 30 and end cap 66 to allow gaseous communication between pressure balance chamber 26 and passage 28. Positioned between the pressure balance chamber 26 and pressure balance chamber passage 74 is a damping orifice 76 which controls the viscous losses of the fluid flow into and out of the pressure balance chamber 26. The poppet stem 36 is designed to be movable with substantially no friction. The only sliding friction occurs between the guide 41 and the poppet stem 36 during actuation. With very little friction, the pressure balanced flow control valve 12 requires a reliable and predictable damping force, not friction, to dampen step change oscillations of the poppet stem 36 and reduce the effect of engine vibrations on the poppet stem 36. The level of viscous damping is controlled by the volume of the pressure balance chamber 26 and the diameter of the damping orifice 76. For instance, the level of viscous damping can be increased by decreasing the diameter of damping orifice 76.

The mode selection valve 14 enables and disables the flow control valve 12 by connecting the pressure balance chamber 26 to either the air stream mixer inlet pressure or the fuel supply pressure. When the mode selection valve 14 is deenergized, the pressure balance chamber 26 is opened to the mixer inlet pressure and the gaseous fuel is closed off from the pressure balance chamber 26. Since the mixer inlet pressure is always much less than the fuel supply pressure, the large closing force generated by the fuel supply pressure acting on the lower diaphragm 46 is not counterbalanced. This closing force is much greater than the maximum force the flow control valve solenoid coil 42 can generate and the flow control valve 12 is disabled regardless of the current flowing through its solenoid coil 42. When the mode selection valve 14 is energized, the flow control valve 12 is pressure balanced with respect to the fuel supply pressure by introducing fuel supply pressure into the pressure balance chamber 26. The solenoid coil 42 can now generate enough force to open the poppet valve 22, since the closing force generated by the fuel acting on lower diaphragm 46 is counterbalanced by the fuel opening forces acting on upper diaphragm 62 and flared end 38. Fuel supply pressure forces are balanced regardless of the fuel supply pressure so fuel supply pressure variations will not affect solenoid coil 42 force requirements.

Figure 7A:
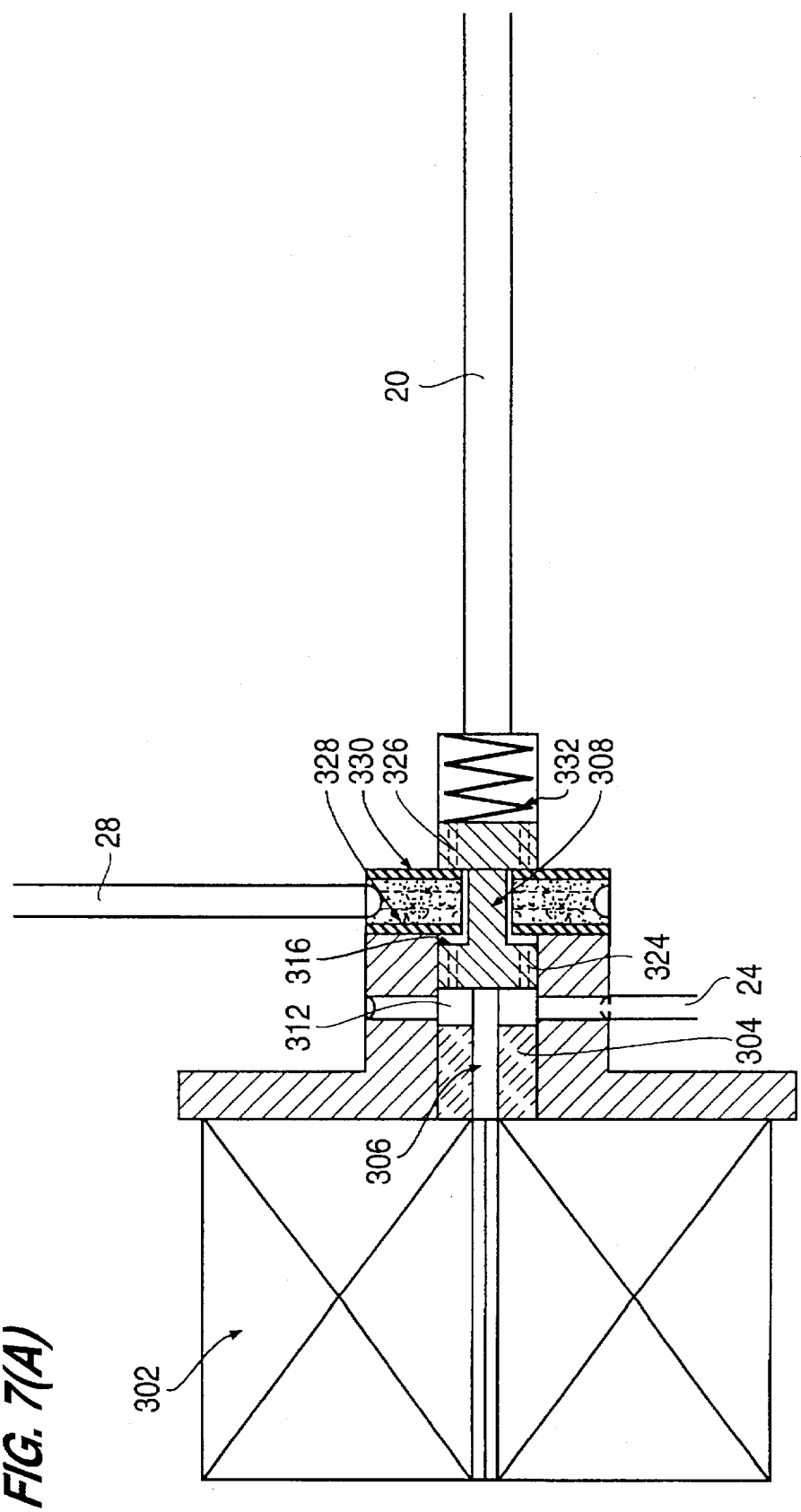
FIG. 7(A) is an enlarged, cross-sectional view of the mode selection valve designed in accordance with the preferred embodiment of the invention shown in its positive fuel shutoff mode.
Figure 7B:
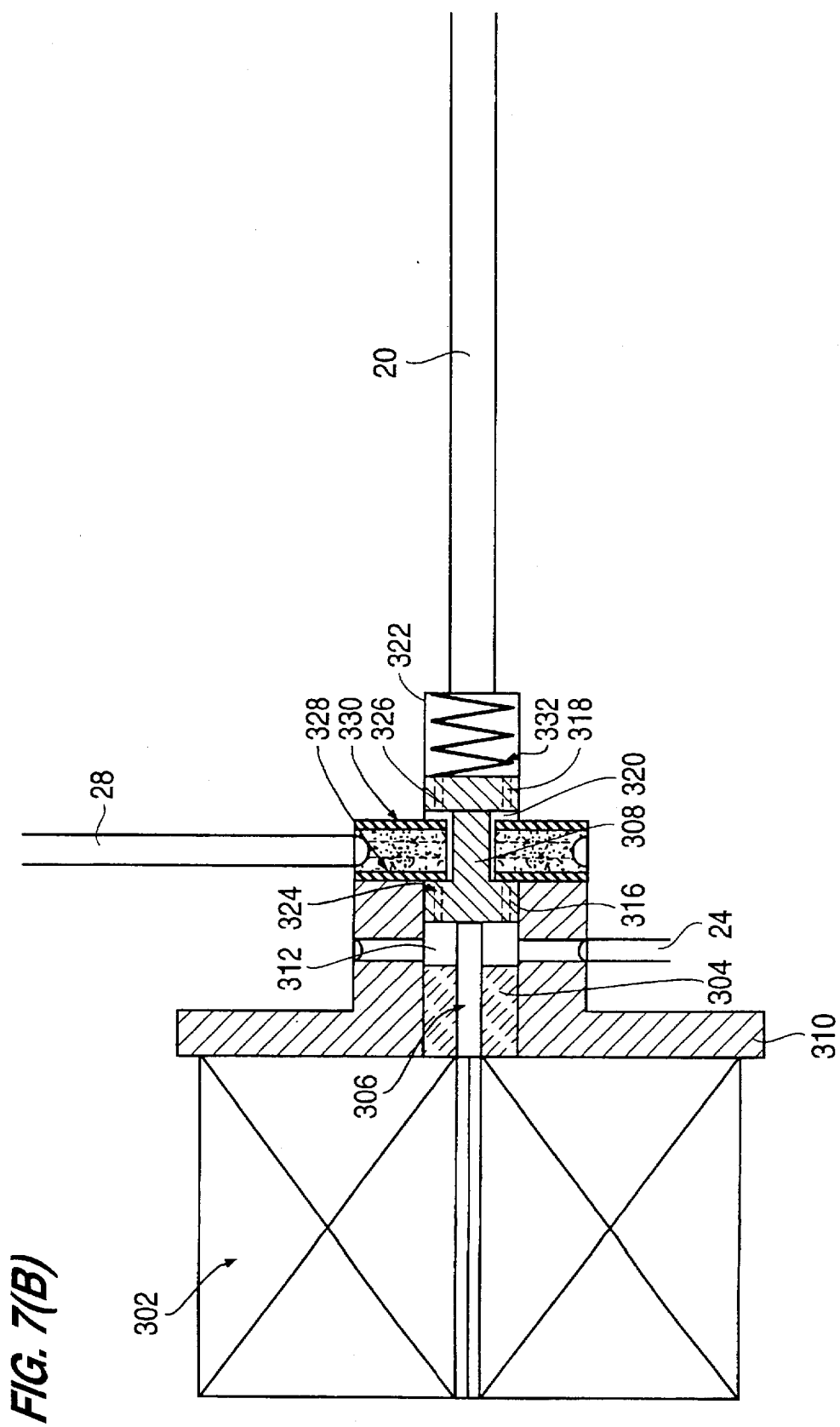
FIG. 7(B) is an enlarged, cross-sectional view of the mode selection valve of FIG. 7(A) in its fuel flow control mode.

The mode selection valve 14 may include any type of valve capable of connecting either the fuel supply pressure or the air stream mixer inlet pressure to the pressure balance chamber 26 depending upon whether the fuel control system 10 is operating in a fuel control mode or positive fuel shutoff mode, where the mode selection valve 14 is preferably a three-way, two-position valve. Referring now to FIGS. 7(A) and 7(B), one embodiment of the mode selection valve 14 of FIG. 1 will be described in greater detail in its flow control and positive fuel shutoff positions, respectively. The mode selection valve 14 includes a solenoid coil 302, an armature 304, and a plunger 306 which actuate a movable spool 308 between two positions within valve housing 310. Plunger 306 is attached to armature 304 on one end and to spool 308 on its opposite end. Plunger 306 and armature 304 may be integrally formed or simply attached there together. When solenoid coil 302 is energized, armature 304 moves toward fuel supply passage 20, which moves plunger 306 and, in turn, spool 308 in the same direction. Spool 308 includes a cylindrical center portion 314 and a rim 316, 318 formed at each end of the center portion 314. Rims 316, 318 have a larger diameter than center portion 314. While spool 308 is described herein as having cylindrical proportions, those skilled in the art recognize that other cross-sectional shapes may be used.

The valve housing 310 includes an air supply chamber 312 through which plunger 306 extends, wherein rim 316 of spool 308 is situated within chamber 312. The valve housing 310 further includes an aperture 320 extending through the housing 310 which connects the air supply chamber 312 to a fuel supply chamber 322. The rim 318 of spool 308 is situated within fuel supply chamber 322 with the center portion 314 of spool 308 extending through aperture 320. Rims 316 and 318 are greater in diameter than aperture 320 so that the rims 316 and 318 may not pass through the aperture 320 and are slightly smaller than the diameter of the inner surface of chambers 312 and 322 so that spool 308 traverses in a stable manner between positions. The diameter of center portion 314 of spool 308 is such that a gaseous fluid may pass between the center portion 314 and the inner surface of aperture 320. The passage 28 connected to the pressure balance chamber 26 extends through valve housing 310 and into aperture 320 at a point between air supply chamber 312 and fuel supply chamber 322. Therefore, any gaseous fluid traveling through aperture 322 will also pass through passage 28 and into pressure balance chamber 26.

Rim 316 includes at least one passageway 324 formed therethrough at a point in the rim 316 located radially outside of the diameter of aperture 322 to provide a gaseous communication path between air supply chamber 312 and aperture 320. Similarly, rim 318 includes at least one passageway 326 formed therethrough at a point in the rim 318 located radially outside of the diameter of aperture 322 to provide a gaseous communication path between fuel supply chamber 322 and aperture 320. The valve housing 310 also includes seals 328 and 330 positioned adjacent respective ends of aperture 320. Each seal 328, 330 includes a central opening therein to allow gaseous fluid flow therethrough. The center portion 314 of spool 308 is longer than the longitudinal length of the aperture 320 combined with the width of seals 328 and 330, so that rim 316 cannot engage seal 328 at the same time as rim 318 engages seal 330. When the rim 316 engages seal 328, one end of passageway 324 abuts seal 328 which prevents the flow of gaseous fluid through the passageway 324. Similarly, passageway 330 is closed on one end when rim 318 engages seal 333.

The mode selection valve 14 determines whether the flow control valve 12 is in a flow control mode or a positive fuel shutoff mode. When solenoid coil 302 is energized, the flow control valve 12 is in the flow control mode. The energized solenoid coil 302 causes armature 304 and, in turn, spool 308 to move in the direction of fuel supply passage 20 through their interconnection by plunger 306. Solenoid coil 302 must exert enough force to overcome a spring 332 in fuel supply chamber 322 which biases the spool 308 into the positive fuel shutoff mode. In the flow control mode as shown in FIG. 7(B), rim 316 is moved into abutment with seal 328 and closes all gaseous communication between the air supply chamber 312 and aperture 320, while a gaseous communication path exists between fuel supply chamber 322 and aperture 320 through passageway 326. Fuel supply chamber 320 is connected to the fuel supply passage 20 coming from the fuel inlet, so that the fuel supply pressure is continuously introduced into fuel supply chamber 322. Therefore, in the fuel control mode, the pressure balance chamber 26 in flow control valve 12 is opened to the fuel supply pressure in passageway 330, traveling through aperture 320 and into passage 28. With the mode selection valve in this position, the flow control valve 12 is pressure balanced and the flow control valve 12 can be actuated to control the fuel flow rate. When the solenoid coil 302 is deenergized, the force exerted by spring 332 returns the spool 308 to the positive fuel shutoff position. The flow control valve 12 is placed into the positive fuel shutoff mode, thus causing actuator 304 to move in a direction away from fuel supply passage 20, which, through plunger 306, causes spool 308 to move in a similar direction opening passageway 324 and closing passageway 326. Therefore, in the positive fuel shutoff mode, the pressure balance chamber 26 is fluidically connected to the air supply chamber 312 through passage way 324, aperture 320 and into passage 28. In the positive fuel shutoff mode, no fuel may travel into passage 28.

When operating in the fuel control mode, the flow control valve 12 is pressure balanced by supplying the same fuel supply pressure into pressure balance chamber 26 as is supplied to the valve supply chamber 32. Since the gaseous fuel forces acting on poppet valve 22 will cancel each other out, it is not necessary to use a large solenoid coil 42 or a large amount of current to actuate the opening of the poppet valve 22, as the only force opposing the opening of the poppet valve 22 is that exerted by flexure spring 56. The pressure balancing achieved by the present invention allows for extremely accurate control of the fuel flow, since the solenoid coil 42 will be able to actuate poppet valve 22 with a faster response time due to the balancing of pressure forces on poppet valve 22. Furthermore, the cone-like shape of the flared end 38 of poppet 36 will direct the gaseous fuel out of tube 34 in a hollow cone spray pattern, which maximizes the mixing of the fuel with air due to the large surface area provided by the hollow cone spray and the fact that the fuel kinetic energy is at a maximum as it leaves poppet valve 22.

The preferred embodiment of the present invention is designed to minimize friction in the poppet valve 22 movement to eliminate sticking and ensure predictable movement of the poppet valve 22. All of the individual components in the integrated gaseous fuel measurement and control system 10 were selected to achieve minimal friction. Frictionless diaphragm seals 46 and 62 were selected over sliding seals. The sensors detect the poppet valve 22 movement without contacting components or requiring sliding seals. The flexure spring 56 provides a frictionless return force and locates the upper portion of the poppet valve 22 to prevent the armature 44 from rubbing against the solenoid coil 42. The only source of sliding friction is the movement of the poppet stem 36 against the seat guide 41. In this area, friction should be very low since radial forces are small.

With low-friction damping the poppet valve 22 movement, unwanted poppet valve 22 oscillations could occur when the flow control valve 12 is given a step input or subjected to engine vibrations. Therefore, a reliable and predictable damping force, other than friction, is provided in the present invention to dampen step change oscillations and reduce the effect of engine vibrations on the poppet valve 22. As the poppet valve 22 opens and closes, gas will enter and exit the pressure balance chamber due to changes in its volume. A predictable and adjustable damping force can be created using the viscous losses of the through a damping orifice 76.

The damping force is provided by the viscous losses of the flow of gaseous fuel into and out of the pressure balance chamber 26 through damping orifice 76. The level of viscous damping is controlled by the volume of the pressure balance chamber 26 and the diameter of the damping orifice 76. Accordingly, the size of pressure balance chamber 26 and damping orifice 76 are predetermined depending upon the damping characteristics desired for the particular flow control valve 12 being used. As poppet valve 22 is opened, the pressure balance chamber 26 will increase in size as diaphragm 62 bends in the direction of the solenoid coil 42. As chamber 26 increases in size more gaseous fuel will enter into the pressure balance chamber 26 through damping orifice 76. Similarly, when poppet valve 22 is closed, the size of pressure balance chamber 26 will decrease back to its normal size and gaseous fuel will be forced out of pressure balance chamber 26 through damping orifice 76. Therefore, the rate at which gaseous fuel flows into and out of pressure balance chamber 26 is determined by the size of damping orifice 76, which in turn controls the amount of damping provided.

When the mode selection valve 14 changes the operating mode of the flow control valve to a positive fuel shutoff mode, the pressure balance chamber 26 is closed off from the fuel supply and the gaseous fuel is removed from pressure balance chamber 26 and pressure balance chamber passage 74. The pressure balance chamber 26 is then opened to a low pressure source, such as the air stream mixer inlet pressure. The air flowing from the air stream mixer inlet is introduced through air supply passage 24, through mode selection valve 14, through passage 28, through pressure balance chamber passage 74, and into pressure balance chamber 26. Meanwhile, gaseous fuel is continuously introduced into valve supply chamber 32 through fuel inlet 18. Since the air stream mixer inlet pressure is much smaller the fuel supply pressure, the fuel supply pressure force exerted on diaphragm 46 will be greater than the air stream mixer inlet pressure force exerted on diaphragm 62. Therefore, the fuel supply pressure force will bias the flow control valve 12 into its closed position, where the biasing closing force increases along with the fuel supply pressure. Similarly, the use of a different low pressure source introduced into the pressure balance chamber 26 would have a pressure lower than that of the gaseous fuel in valve supply chamber 32. In the positive fuel shutoff mode, the force exerted by the fuel supply pressure is greater than the force which solenoid coil 42 may exert when actuated. Therefore, solenoid coil 42 can not open the poppet valve 22 when the flow control valve 12 is in the positive fuel shutoff mode, since solenoid coil 42 can not exert enough force to overcome the fuel supply pressure force.

As described above, the fuel measurement and control system 10 has dual fuel shutoff features. In the fuel control mode, the flow control valve 12 can control the flow of gaseous fuel by actuating the poppet valve 22. When the solenoid coil 42 of flow control valve 12 is not energized, the flow control valve 12 remains in its closed position and no gaseous fuel is introduced into the air stream mixer inlet 16. In the positive fuel shutoff mode, the flow control valve 12 is prevented from actuating poppet valve 22. Therefore, mode selection valve 14 may serve as a redundant shutoff device to close poppet valve 22 by switching to the positive fuel shutoff mode. Having the dual fuel shutoff control provides an emergency shutoff system in case a problem arises, such as an electrical short, which causes the solenoid valve 42 in flow control valve 12 to remain energized longer than it should be. The configuration of the present invention allows fuel flow to be shutoff from either the flow control valve 12 or the mode selection valve 14. Both the flow control valve 12 and the mode selection valve 14 are designed such that when either of the solenoid coils 42 and 302 are deenergized, the flow control valve 12 remains in a closed position. Thus, the present invention provides a default shutoff to prevent the flow control valve 12 from remaining open if the control power supplied to the solenoid coils 42 and 302 is accidentally interrupted.

The fuel measurement and control system 10 described above has numerous distinct advantages: reduced cost and reduced fuel system pressure losses while maintaining redundant fuel shutoff. The entire engine flow does not pass through a separate shutoff valve, so a much smaller, less expensive valve can be used to accomplish positive fuel shut off. The pressure loss across a separate shutoff valve is also eliminated. This arrangement still provides redundant fuel shutoff methods from either, deenergizing the flow control valve solenoid 42 or deenergizing the mode selection valve 14.

Figure 8:
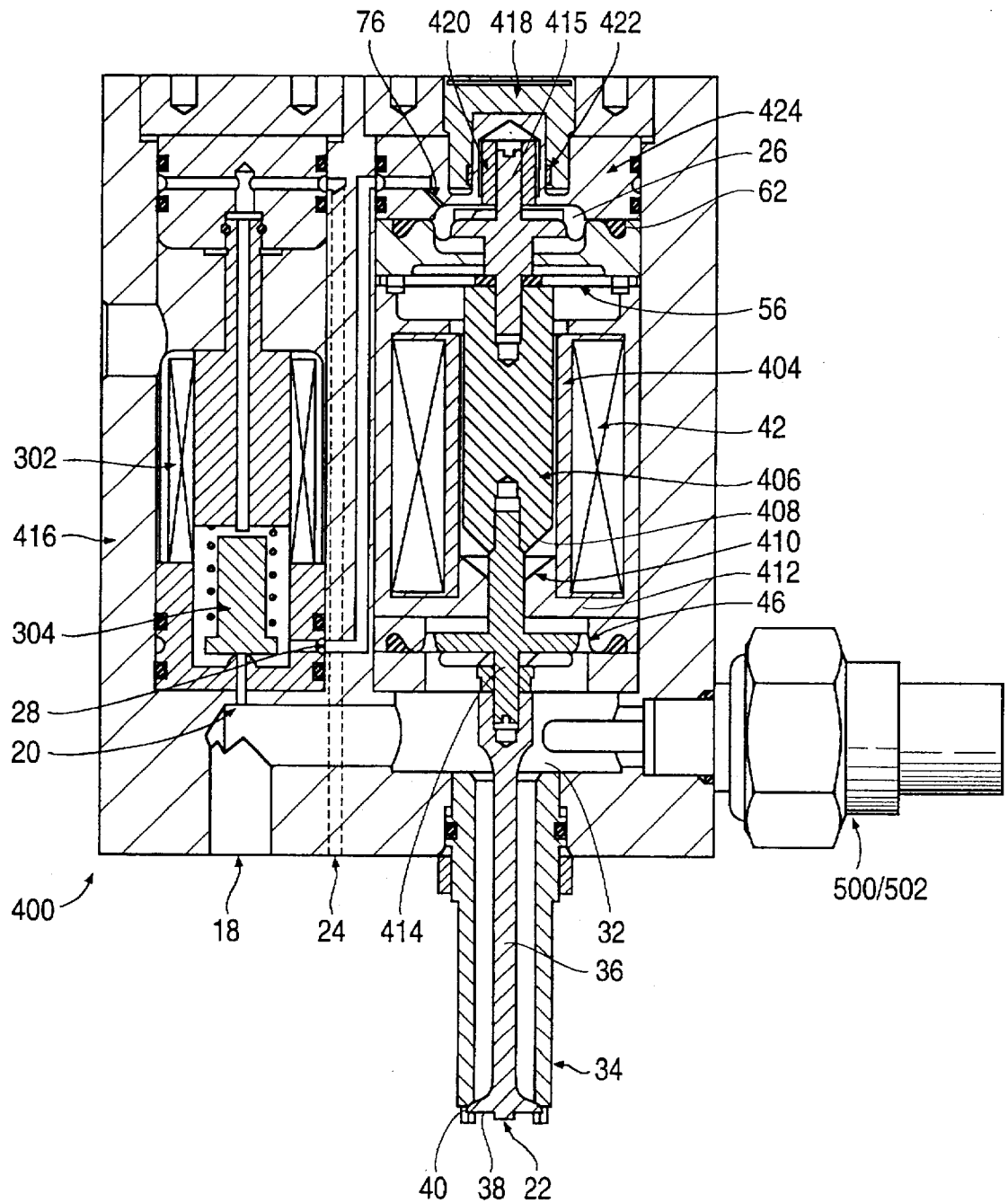
FIG. 8 is a cross-sectional view of the fuel measurement and control system designed in accordance with another preferred embodiment of the invention.

Referring now to FIG. 8, another preferred embodiment of the gaseous fuel measurement and control system 400 is illustrated. All components of FIG. 8 function equivalently to the similarly numbered components in the other Figures described above in connection with the other embodiments, and therefore a description of similarly numbered components is omitted from the description of this embodiment. The solenoid coil 42 is wrapped around a heat resistant bobbin 404, where a plunger assembly 406 passes through a central cavity in the bobbin 404. The plunger 406 includes a tapered end 408 which is receivable within a similarly tapered recess 410 formed in a stator 412. An air gap is always present between the surfaces of the tapered end 408 and the tapered recess 410 so that they never contact one another during actuation. The plunger 406 is interconnected to the poppet stem 36 through a lower connecting plunger 414, wherein the diaphragm 46 extends around lower connecting plunger 414. An upper connecting plunger 415 extends from the upper surface of the plunger 406. In this embodiment, both the mode selection valve 14 and the flow control valve 12 are contained within a single housing 416.

The gaseous control system 410 includes a displacement sensor 418 for measuring the displacement of the poppet stem 36, where displacement sensor 418 may be any type of sensor having no contact friction with the poppet stem 36, such as a Hall Effect device. The Hall Effect displacement sensor 418 senses the position of a magnet 420 connected to an upper portion of the upper portion of upper connecting plunger 415 relative to a Hall Effect chip 422 positioned within the displacement sensor 418. As the magnet 420 moves moves in conjunction with poppet valve 22, the magnetic flux across the Hall Effect chip 422 changes which, in turn, changes the electronic output from the Hall Effect chip 422. The Hall Effect chip 422 can sense the magnet flux through the wall of an upper seal plug 424 extending between the magnet 420 and the displacement sensor 418. Thus, displacement sensor 418 does not engage any portion of upper connecting plunger 415 and, hence, there is no contact friction on the poppet valve 22 from the displacement sensor 418.

When using a Hall Effect displacement sensor 418, it is possible to use a programmable linear Hall device. The sensor chip 422 can be programmed (otherwise known as calibrated) at two points within the operating range of the sensor 418 using an external computer interface. The intent is to program the displacement sensor 418 in the closed and fully open positions. In the closed position, the displacement sensor 418 is programmed to output 0.5V. The poppet valve 22 will then be opened against a stop which is set precisely at the maximum travel position for the poppet valve 22. The displacement sensor 418 is then programmed to output 4.5V. The device output is linear with respect to poppet valve 22 position, so that all intermediate displacements can be determined by linear interpolation. The specific values described above with programming a linear Hall Effect device are listed merely for the purposes of illustrating one possible programming method; however, it is understood that the present invention is not limited to this specific programming method and may encompass other similar programming methods for the displacement sensor 418.

Thermal effects and wear around the flared end 38 of poppet stem 36 and seat 40 will change the relationship between the displacement sensor 418 measurement and the actual gap between the flared end 38 of poppet stem 36 and seat 40. The solenoid coil 42 windings can further heat and elongate the internal parts. Large errors due to thermal effects are especially likely at the low flow rates when the engine is idling. To counteract these thermal effects, a rezeroing strategy can be implemented whereby each time the poppet valve 22 is closed a new displacement sensor 418 output will be used as the zero reference. The sensitivity of the displacement sensor 418 is very stable so an accurate poppet valve 22 displacement measurement can be made by knowing the closed position voltage. A new zero reference will be obtained each time the flow control valve 12 shuts during engine motoring. Also forced rezeroing can be performed if a substantial time has passed since the last rezeroing.

The displacement sensor 418 is preferably installed and calibrated after the proper preload for the flexure spring 56 is established. Setting the proper flexure spring 56 preload is important to prevent the poppet valve 22 from opening when the engine is subjected to low frequency accelerations during normal driving maneuvers. A preload that prevents a 3G acceleration from opening the poppet valve 22 is preferably desired. The poppet seat 40 may be threaded into tube 34 so that the flexure spring 56 preload can be adjusted by turning the poppet seat 40, which would move the poppet stem 36 and, in turn, the flexure spring 56, thus setting the preload of the flexure spring 56. In one possible embodiment, the poppet valve 22 mass is 0.161 bf so that an acceleration of 3G's will be necessary to open the poppet valve 22 when the flexure spring 56 preload is set at 0.481 bf.

Figure 9:
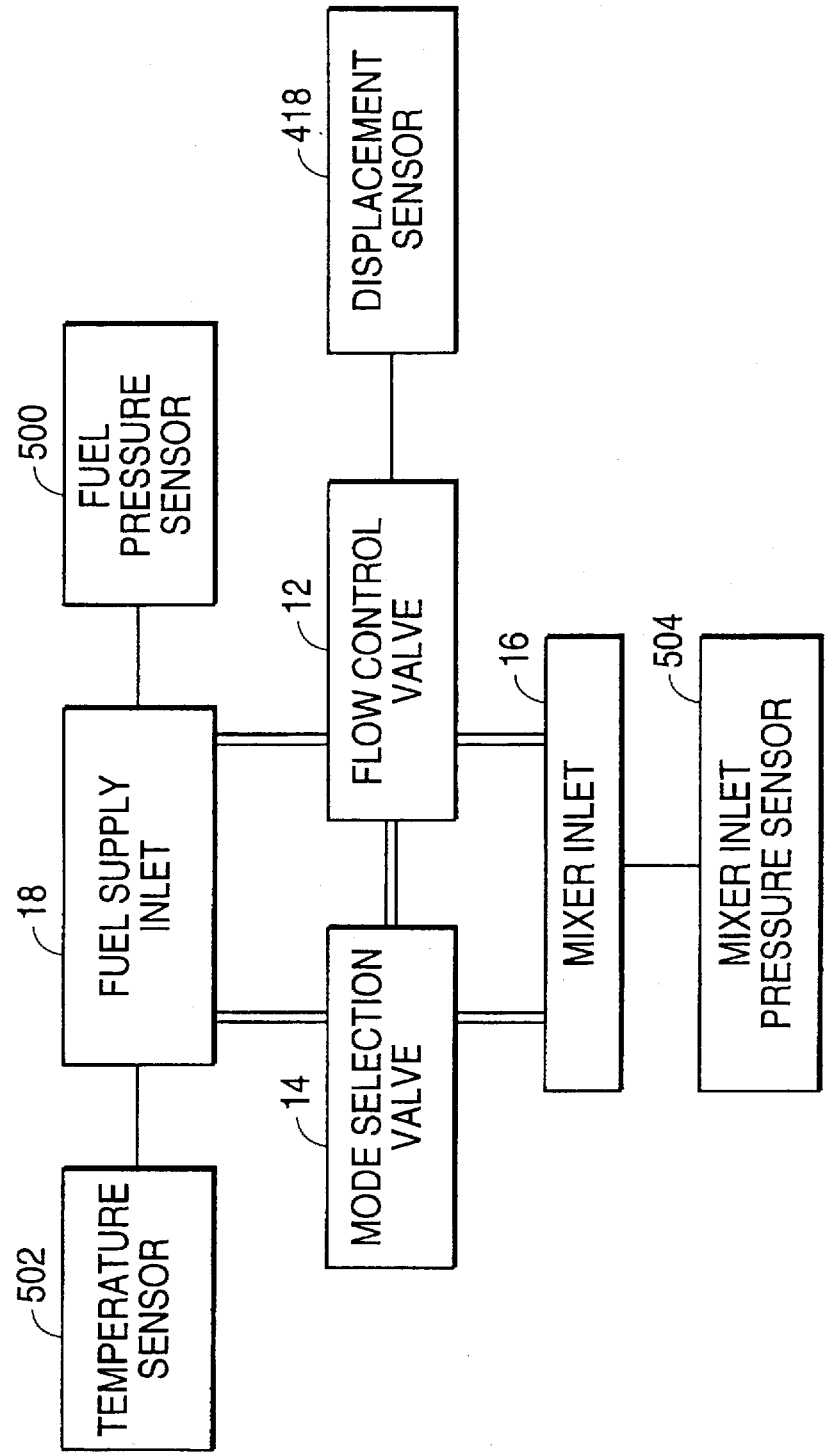
FIG. 9 is a schematic block diagram of the components of the fuel measurement and control system designed in accordance with the preferred embodiment of the present invention.

When operating in the flow control mode, the gaseous fuel measurement and control system 10 may actuate the flow control valve 12 in any manner to control the flow of gaseous fuel. In order to accurately measure the gaseous fuel mass which is injected by flow control valve 12, the gaseous fuel measurement and control system 10 of the present invention may also include a fuel pressure sensor 500, a fuel temperature sensor 502, an air stream mixer inlet pressure sensor 504, and a poppet valve displacement sensor 418, as shown in block schematic diagram in FIG. 9. The fuel measurement and control system 10 measures the gaseous fuel temperature using fuel temperature sensor 502 and the gaseous fuel pressure using fuel pressure sensor 500 which are positioned upstream of the point where gaseous fuel is introduced into the air stream. The mixer inlet pressure is measured downstream of the gaseous fuel introduction point by the mixer inlet pressure sensor 504. These measurements are then used with a commanded mass flow rate for the gaseous fuel in an orifice flow equation to determine the desired mass flow rate for the gaseous fuel. An effective flow area for the gaseous fuel is then determined for the desired gas mass flow rate, wherein the flow control valve 12 is opened for a duration and distance corresponding to the determined effective flow area.

The fuel flow rate through the poppet stem 36 open area is governed by a compressible orifice flow equation. A form of this equation may be programmed into the Electronic Control Unit (ECU) to provide flow rate feedback using the poppet valve 22 displacement, fuel supply temperature and pressure, and mixer inlet pressure as inputs. The compressible orifice flow equation requires a known effective flow area between the flared end 38 of the poppet stem 36 and the seat 40, which can be experimentally determined, stored in the ECU, and correlated with the poppet displacement sensor output. The compressible orifice flow equation is as follows:

$$m = \frac{A_{\textit{eff}} P_{sc}}{\sqrt{RT_{sc}}} \phi$$

where, $A_{\textit{eff}}$—Effective flow area of poppet $P_{SC}$—Supply Chamber 32 Fuel Pressure $T_{SC}$—Supply Chamber 32 Fuel Temperature R—Contact Diameter and $\phi$—Flow function defined by the following equation:

$$\phi = \begin{cases} \left( \left(\frac{P_{mip}}{P_{sc}}\right)^{\frac{1}{\gamma}} \left(\frac{2\gamma}{\gamma-1}\left[1-\left(\frac{P_{mip}}{P_{sc}}\right)^{\frac{\gamma-1}{\gamma}}\right]\right) \right)^{1/2}, & \text{if unchoked } \frac{P_{mip}}{P_{sc}} > Pc \\ \gamma^{1/2}\left(\frac{2}{\gamma-1}\right)^{\frac{(\gamma+1)}{2(\gamma-1)}}, & \text{if choked } \frac{P_{mip}}{P_{sc}} \leq Pc \end{cases}$$

where, $P_{mip}$—Mixer inlet pressure $\gamma$—Specific heat ratio $P_c$—Critical Pressure ratio as defined by the following equation:

$$Pc = \left(\frac{2}{\gamma+1}\right)^{\frac{\gamma}{\gamma-1}}$$

The effective flow area is smaller than the geometric area because of fluid boundary layers and flow separation. The discharge coefficient $C_d$ is used to relate the geometric flow area and effective flow area using the following equation:

$$C_d = \frac{A_{\textit{eff}}}{A_{\textit{geometric}}}$$

The fuel measurement and control system 10 formed in accordance with the present invention allows gaseous fuel to be constantly supplied to valve supply chamber 32 within flow control valve 12. Therefore, whenever the flow control valve 12 is to control metering and introduce gaseous fuel into the engine, the gaseous fuel to be introduced is already present within the flow control valve 12 which allows for a quick response time by the fuel measurement and control system 10.

The response time required to open or shut the flow control valve 12 is an important performance variable. The overall flow control valve 12 response time depends on two timescales stemming from the natural frequency of the flexure spring 56/poppet valve 22 system and the time required to buildup or drop current in the solenoid coil 42. The flow control valve 12 should preferably be able to provide full fuel flow twice as fast as the intake manifold filling dynamics. This drives the requirement for executing a full poppet valve 22 excursion within 0.050s.

Figure 10:
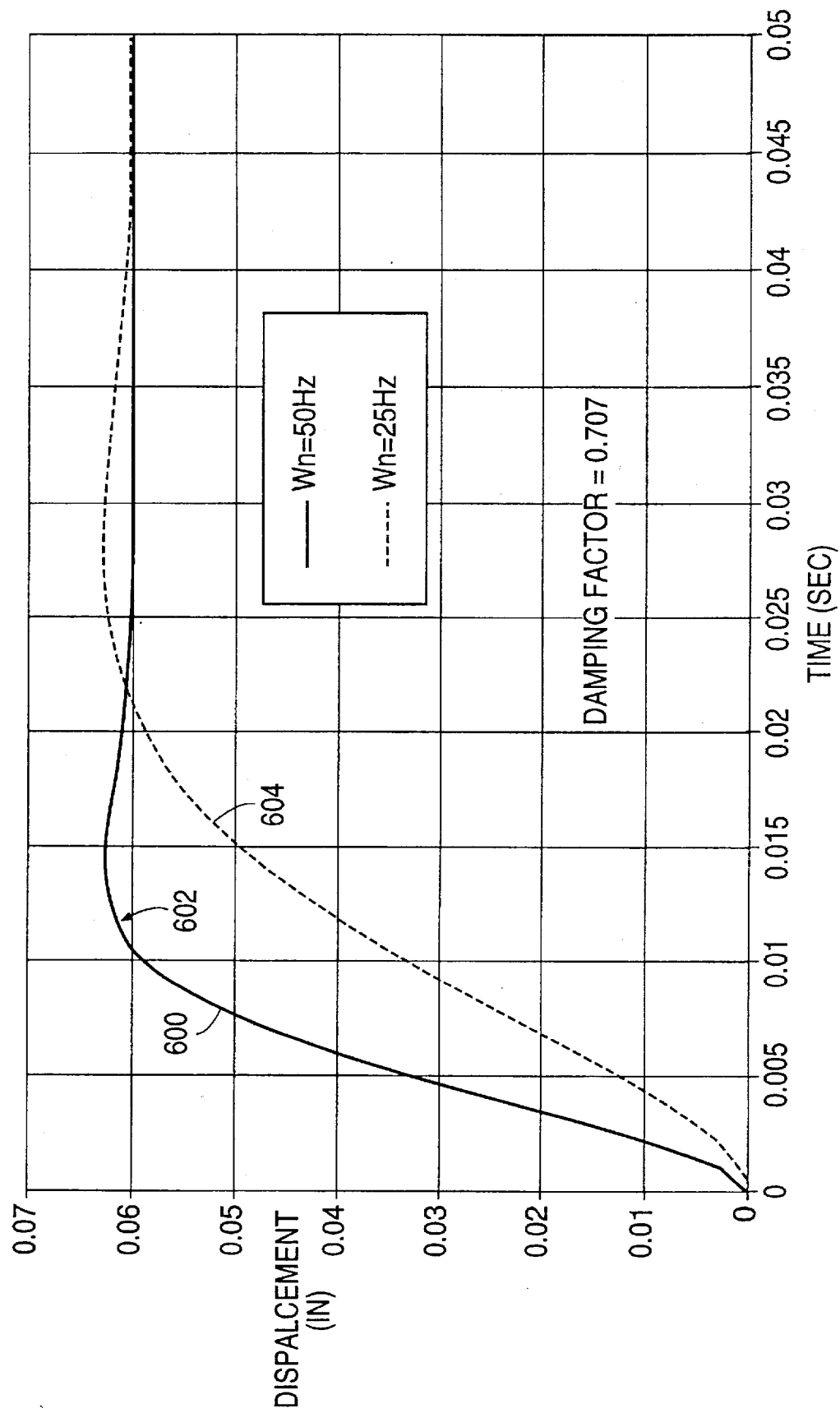
FIG. 10 is a graphical illustration of the step response time of the flow control valve of the present invention showing the flow control valve displacement as a function of time for different flow control valve natural frequencies.

To achieve the response time requirement, the flow control valve 12 may be operated using 50 Hz for the poppet valve 22 natural frequency. The natural frequency, $\omega_n$, is defined by:

$$w_n = \sqrt{\frac{k}{m}}$$

where k is the spring rate and m is the poppet valve 22 mass. FIG. 10 illustrates the step response of a 50 Hz flexure spring 56/poppet valve 22 system that is properly damped with a damping factor of 0.707. Line 600 indicates the step response for $\omega_n=50$ Hz with point 602 being the desired target value, while line 604 indicates the step response for $\omega_n=25$ Hz. The time require to settle to the final displacement takes approximately 0.022 sec when $\omega_n=50$ Hz. The response time decreases as the natural frequency decreases. Therefore, for a quick response, the poppet valve 22 mass should be minimized and the spring rate maximized to the extent that the solenoid coil 42 can generate the required force.

The second timescale is the solenoid coil 42 circuit time constant which is defined by $\tau_c=L/R$, where L is the solenoid coil 42 inductance and R the solenoid 42 coil resistance. The response time improves for decreasing time constants and should be less than 0.015 to achieve the overall system response time of 0.050 sec. To help minimize this time constant, the maximum solenoid coil 42 resistance allowed by the system voltage and ECU driver amperage is used. Therefore, minimizing the coil inductance will decrease the coil circuit time constant.

Figure 11:
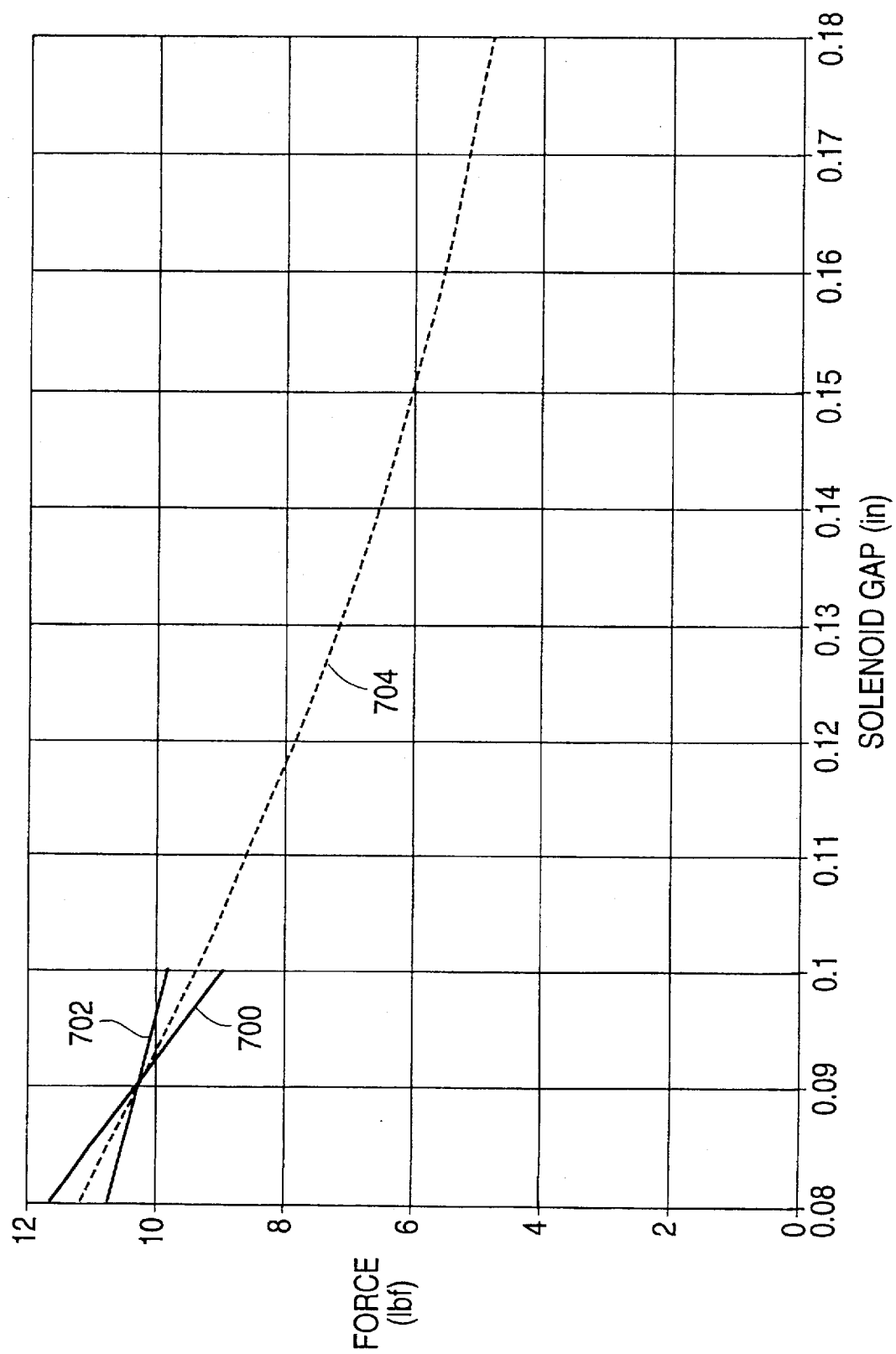
FIG. 11 is a graphical illustration of the force exerted by the solenoid actuator of the present invention as a function of solenoid gap between the plunger and stator seat in the flow control valve.
Figure 12:
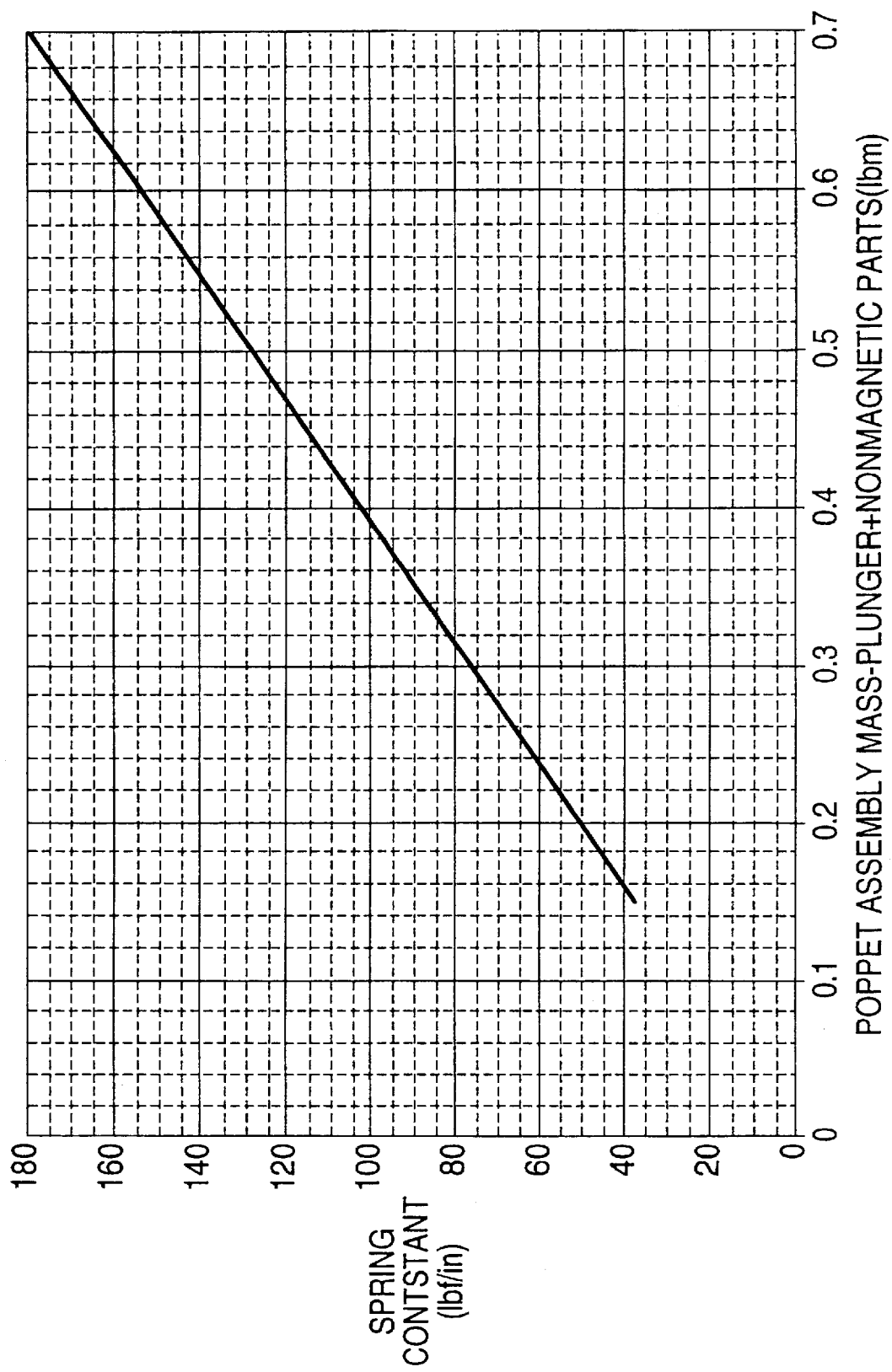
FIG. 12 is a graphical illustration of the spring rate of the flow control valve of the present invention as a function of the mass of the moveable components of the flow control valve.

The open-loop control of the poppet valve 22 movement must be inherently stable in the event that the position feedback ever fails. Therefore, the solenoid force characteristics must closely match the flexure spring rate. Magnetic analysis shows that the solenoid generates greater force as the gap between the plunger 406 and the stator seat 408 decreases, as shown in the graphical illustration of the solenoid force plotted against solenoid gap in FIG. 11. Line 700 indicates a stable spring rate while line 702 represents an unstable spring rate, and dashed line 704 represents the solenoid force as a function of the solenoid gap. A small disturbance (i.e. engine vibration) which closes the solenoid gap, can cause an uncommanded opening of the poppet valve 22 if the solenoid force increases at a rate higher than the spring can oppose. Therefore the solenoid coil 42 and spring rate selected so that the spring force is always greater than the increase in solenoid force from gap-closing movements. FIG. 12 illustrates the spring rate as a function of the poppet valve 22 assembly mass, including the plunger and non-magnetic parts, for a poppet valve 22 natural frequency of 50 Hz in order to meet response time requirements. The spring rate can be obtained from this correspondence once the poppet valve 22 mass is known.

As can be seen from the foregoing, a fuel measurement and control system formed in accordance with the present invention will provide a fast-acting and accurate control valve for introducing gaseous fuel into an engine. Moreover, by forming a fuel measurement and control system in accordance with the present invention, the fuel to be introduced into the engine is also used to pressure balance the control valve to precisely balance the biasing forces acting on the control valve from the fuel while also dampening oscillations and vibrations experienced by the control valve. Furthermore, a fuel measurement and control system formed in accordance with the present invention provides dual shutoff features which ensure the closing of the fuel control valve in case of an electrical short or other similar problem.

What is claimed is:

1. A control system for a gaseous fuel engine, comprising:
    fuel supply means including a supply passage for supplying gaseous fuel;
    a fuel flow control means for controlling the flow of gaseous fuel from said supply passage into the engine, said fuel flow control means including a valve element mounted for reciprocal movement and a valve actuator for moving said valve element between an open position permitting gaseous fuel flow into the engine and a closed position blocking fuel flow into the engine,
    a mode control means for selectively switching the control system between a fuel flow control mode in which said valve actuator may be operated to move said valve element between said open and closed positions and a positive fuel shutoff mode in which said valve actuator is prevented from moving said valve element into said open position.

2. The control system for a gaseous fuel engine as defined in claim 1, wherein said fuel flow control means is subject to biasing forces produced by said gaseous fuel, said fuel flow control means further including force balancing means for balancing the fuel biasing forces on said valve element.

3. The control system for a gaseous fuel engine as defined in claim 2, wherein said valve element includes a valve stem extending from a first side of said valve actuator, said force balancing means includes a pressure balance chamber positioned on a second side of said valve actuator opposite said first side.

4. The control system for a gaseous fuel engine as defined in claim 3, wherein said mode control means comprises a three-way valve capable of fluidically connecting said pressure balance chamber to one of said fuel supply passage and a low pressure source.

5. The control system for a gaseous fuel engine as defined in claim 3, wherein said low pressure source is an engine air stream mixer inlet.

6. The control system for a gaseous fuel engine as defined in claim 4, wherein said mode control means connects said pressure balance chamber to said fuel supply means to balance the biasing forces acting on said valve element when operating in said fuel flow control mode.

7. The control system for a gaseous fuel engine as defined in claim 5, wherein said mode control means connects said pressure balance chamber to said air stream mixer inlet pressure to permit the fuel pressure biasing forces to bias said valve element into a closed position when operating in said positive fuel shutoff mode.

8. The control system for a gaseous fuel engine as defined in claim 3, further including damping means connected to said pressure balance chamber for damping the oscillations of said valve element.

9. The control system for a gaseous fuel engine as defined in claim 8, wherein said damping means includes a bleed passage connected to said pressure balance chamber for controlling the flow of a gaseous fluid into and out of said pressure balance chamber, said bleed passage having a predetermined diameter for at least partially determining the amount damping provided by said damping means.

10. The control system for a gaseous fuel engine as defined in claim 1, further including fuel flow measurement means for measuring the amount of fuel flow during the actuation of said valve element.

11. The control system for a gaseous fuel engine as defined in claim 10, wherein said fuel flow measurement means includes a supply pressure sensor for measuring the fuel supply pressure, an air stream mixer inlet pressure sensor for measuring an air stream mixer inlet pressure, a temperature sensor for measuring the fuel supply temperature, and a displacement sensor for measuring the amount of movement of said valve element.

12. The control system for a gaseous fuel engine as defined in claim 1, wherein said valve element comprises a poppet valve; said valve actuator comprising a solenoid actuator.

13. The control system for a gaseous fuel engine as defined in claim 3, wherein said valve element passes through a guide element which assists in controlling the direction of the reciprocating movement of the valve element; wherein said valve element slidably contacts no other structure of the control system other than said guide element.

14. The control system for a gaseous fuel engine as defined in claim 3, wherein said fuel flow control means and said mode control means are contained within a single housing.

15. A fuel measurement and control system for a gaseous fuel engine, comprising:

fuel supply means including a supply passage for supplying gaseous fuel;

a fuel flow control means for controlling the flow of gaseous fuel from said supply passage into the engine; said fuel flow control means including a valve element mounted for reciprocal movement and a valve actuator for moving said valve element between an open position permitting gaseous fuel flow into the engine and a closed position blocking fuel flow into the engine;

force balancing means for balancing the fuel biasing forces on said valve element; said force balancing means including a pressure balance chamber positioned on an opposite side of said solenoid actuator from said valve element; and damping means connected to said pressure balance chamber for dampening oscillations of said valve element.

16. The fuel measurement and control system for a gaseous fuel engine as defined in claim 15, wherein said damping means includes a bleed passage connected to said pressure balance chamber for controlling the flow of a gaseous fluid into and out of said pressure balance chamber, said bleed passage having a predetermined diameter for at least partially determining the amount damping provided by said damping means.

17. The fuel measurement and control system for a gaseous fuel engine as defined in claim 15, wherein said force balancing means utilizes said gaseous fuel for balancing said biasing forces produced by said gaseous fuel.

18. The fuel measurement and control system for a gaseous fuel engine as defined in claim 15, further including a mode control means for selectively switching the control system between a fuel flow control mode in which said valve actuator may be operated to move said valve element between said open and closed positions and a positive fuel shutoff mode in which said valve actuator is prevented from moving said valve element into said open position.

19. The fuel measurement and control system for a gaseous fuel engine as defined in claim 18, wherein said mode control means comprises a three-way valve capable of fluidically connecting said pressure balance chamber to one of said fuel supply passage and a low pressure source.

20. The fuel measurement and control system for a gaseous fuel engine as defined in claim 19, wherein said low pressure source is an engine air stream mixer inlet.

21. The fuel measurement and control system for a gaseous fuel engine as defined in claim 19, wherein said mode control means connects said pressure balance chamber to said fuel supply pressure to balance the biasing forces acting on said valve element when operating in said fuel flow control mode.

22. The fuel measurement and control system for a gaseous fuel engine as defined in claim 19, wherein said mode control means connects said pressure balance chamber to said low pressure source to permit the fuel pressure biasing forces to bias said valve element in a closed position when operating in said positive fuel shutoff mode.

23. The fuel measurement and control system for a gaseous fuel engine as defined in claim 15, further including a fuel flow measurement means for measuring the amount of fuel flow during the actuation of said valve element.

24. The fuel measurement and control system for a gaseous fuel engine as defined in claim 23, wherein said fuel flow measurement means includes a supply pressure sensor for measuring the fuel supply pressure, an air stream mixer inlet pressure sensor for measuring an air stream mixer inlet pressure, a temperature sensor for measuring the fuel supply temperature, and a displacement sensor for measuring the amount of movement of said valve element.

25. The fuel measurement and control system for a gaseous fuel engine as defined in claim 15, wherein said valve element passes through a guide element which assists in controlling the direction of the reciprocating movement of the valve element; wherein said valve element slidably contacts no other structure of the control system other than said guide element.

26. The fuel measurement and control system for a gaseous fuel engine as defined in claim 15, wherein said fuel flow control means, said mode control means, said force balancing means, and said damping means are contained within a single housing.

27. A method for controlling the introduction of a gaseous fuel into an engine through a fuel flow control valve, comprising the steps of:

supplying the gaseous fuel to a supply chamber in a fuel flow control valve, said fuel flow control valve including a valve element mounted for reciprocal movement and a valve actuator for moving said valve element between an open position permitting gaseous fuel flow into the engine and a closed position blocking fuel flow into the engine;

determining an operating mode of the fuel flow control valve, wherein the fuel flow control valve may be operated in a fuel flow control mode in which said valve actuator may be operated to move said valve element between said open and closed positions and a positive fuel shutoff mode in which said valve actuator is prevented from moving said valve element into said open position;

controlling a mode selection valve in response to said operating mode determination, said mode selection valve being connected to a pressure balance chamber located in the fuel flow control valve which balances biasing forces acting on said solenoid actuated valve element produced by said gaseous fuel, wherein said mode selection valve is capable of fluidically connecting said pressure balance chamber to said gaseous fuel supply and a low pressure source;

wherein said mode selection valve controls which of said gaseous fuel supply and a low pressure source is fluidically connected to said pressure balance chamber depending upon said operating mode of said fuel flow control valve.

28. The method for controlling the introduction of a gaseous fuel into an engine as defined in claim 27, wherein a pressure differential between the gaseous fuel in said supply chamber and the pressure of the low pressure source biases the fuel flow control valve into a closed position and prevents the opening of the fuel flow control valve.

29. The method for controlling the introduction of a gaseous fuel into an engine as defined in claim 28, wherein said low pressure source is an engine air stream mixer inlet.

30. The method for controlling the introduction of a gaseous fuel into an engine as defined in claim 27, further comprising the step of damping the oscillations of the fuel flow control valve.

31. The method for controlling the introduction of a gaseous fuel into an engine as defined in claim 27, further comprising the step of measuring the amount of fuel flow during the actuation of the fuel flow control valve.

32. The method for controlling the introduction of a gaseous fuel into an engine as defined in claim 27, wherein said fuel flow control valve, said mode control valve, and said pressure balance chamber are contained within a single housing.

* * * * *